(12) United States Patent
Neill et al.

(10) Patent No.: US 10,536,755 B1
(45) Date of Patent: Jan. 14, 2020

(54) SYSTEM FOR UNIFIED AD DELIVERY TO CONSUMER DEVICES WITHIN SERVICE PROVIDER NETWORKS

(71) Applicant: DevelopOnBox, LLC, Hicksville, NY (US)

(72) Inventors: Richard Neill, Garrison, NY (US); Alexei Savguira, North York (CA); Valerii Grishin, Farmingville, NY (US); Leon Rivkin, Muttontown, NY (US)

(73) Assignee: DevelopOnBox, LLC, Hicksville, NY (US)

( * ) Notice: Subject to any disclaimer, the term of this patent is extended or adjusted under 35 U.S.C. 154(b) by 0 days.

(21) Appl. No.: 15/940,916

(22) Filed: Mar. 29, 2018

Related U.S. Application Data

(60) Provisional application No. 62/478,311, filed on Mar. 29, 2017.

(51) Int. Cl.
| | | |
|---|---|---|
| *H04N 21/81* | (2011.01) | |
| *H04N 21/234* | (2011.01) | |
| *H04N 21/643* | (2011.01) | |

(52) U.S. Cl.
CPC ..... *H04N 21/812* (2013.01); *H04N 21/23424* (2013.01); *H04N 21/64322* (2013.01)

(58) Field of Classification Search
CPC ........... H04N 21/812; H04N 21/23424; H04N 21/64322
See application file for complete search history.

(56) References Cited

U.S. PATENT DOCUMENTS

| | | | | |
|---|---|---|---|---|
| 8,676,900 | B2* | 3/2014 | Yruski | G06Q 30/02 705/14.1 |
| 2009/0031339 | A1* | 1/2009 | Pickens | H04N 21/812 725/32 |
| 2010/0325657 | A1* | 12/2010 | Sellers | H04N 21/23424 725/32 |
| 2011/0107379 | A1* | 5/2011 | Lajoie | H04L 65/4084 725/87 |
| 2018/0131975 | A1* | 5/2018 | Badawiyeh | H04N 21/23424 |

\* cited by examiner

*Primary Examiner* — Pankaj Kumar
*Assistant Examiner* — Alexander Boyd
(74) *Attorney, Agent, or Firm* — Lawrence G. Fridman, Esq.; Feigin & Fridman, LLC

(57) ABSTRACT

A method for ad delivery placements to consumer devices within managed service provider networks. Real-time, targeted video advertisements delivery to at least one consumer device is provided across multiple content delivery services accessible to viewers. A unified system capable of simultaneous targeting and delivery of a video advertisement is supported across multiple content delivery platforms to one or more consumer devices. Delivery of the targeted video advertisements is supported to managed service provider devices. Efficient IP delivery of video advertisements is supported to service provider managed networks of consumer devices. Real-time targeted advertisements to all IP connected devices and managed consumer devices are supported based on targeting criteria.

13 Claims, 28 Drawing Sheets

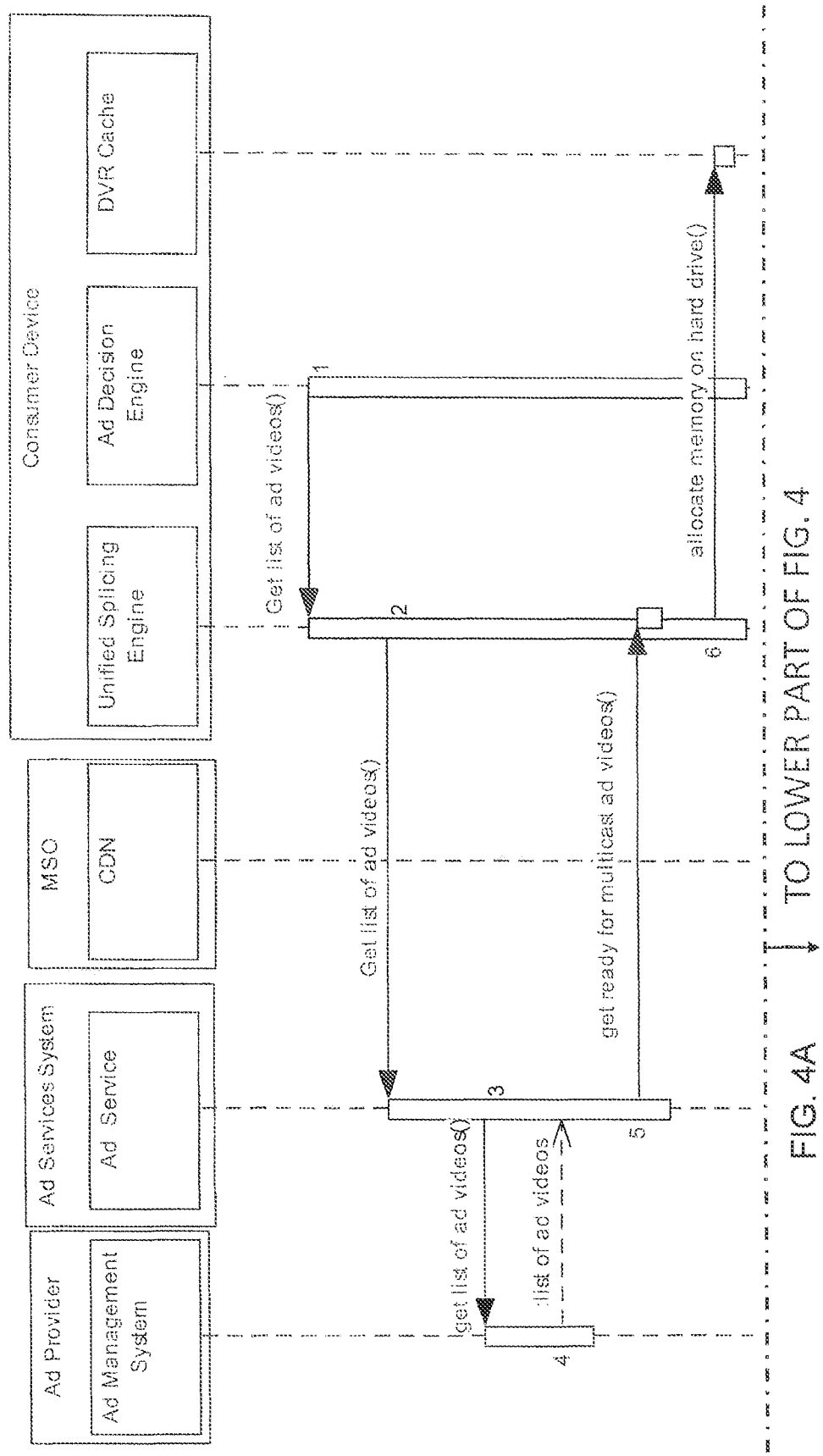

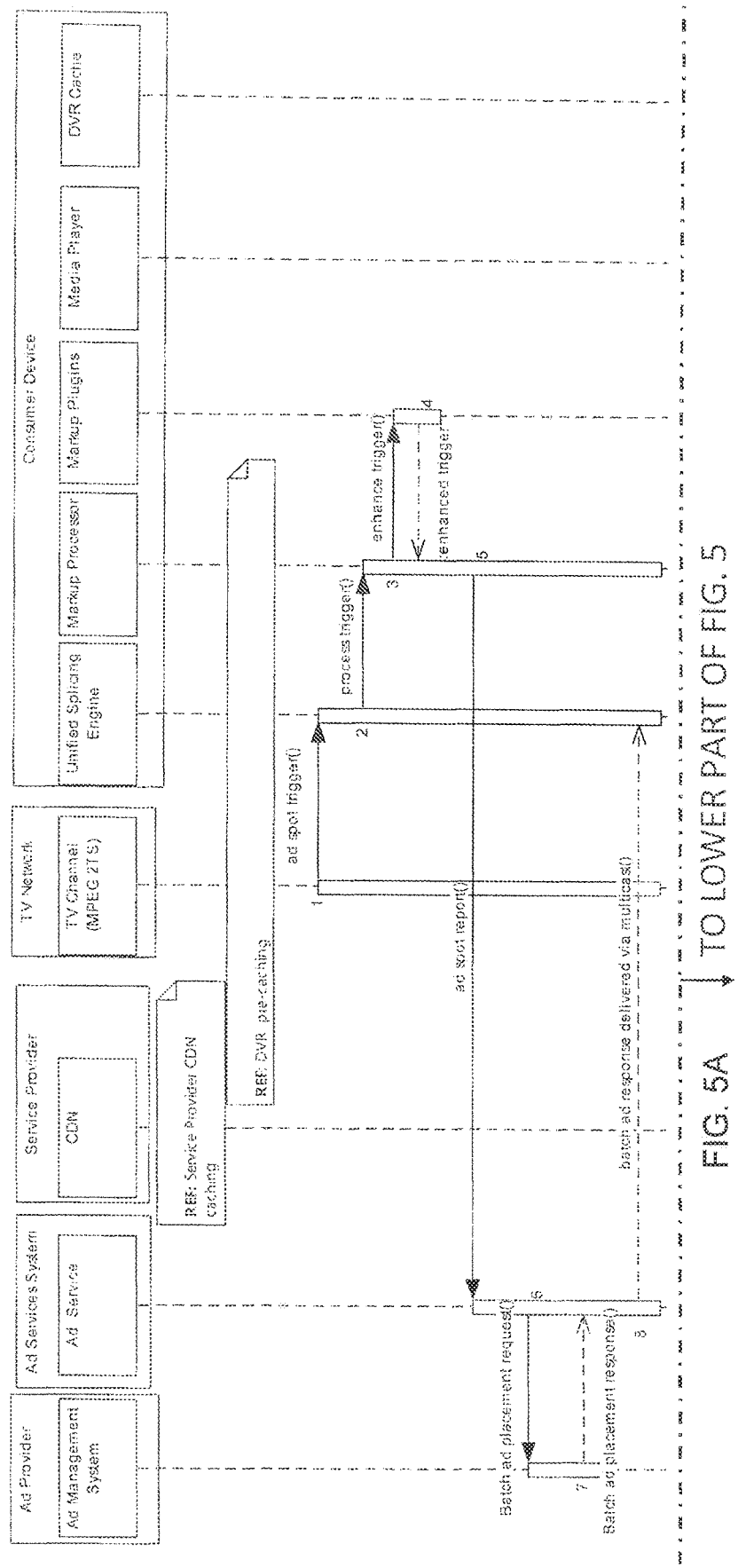
FIG. 5A ↓ TO LOWER PART OF FIG. 5

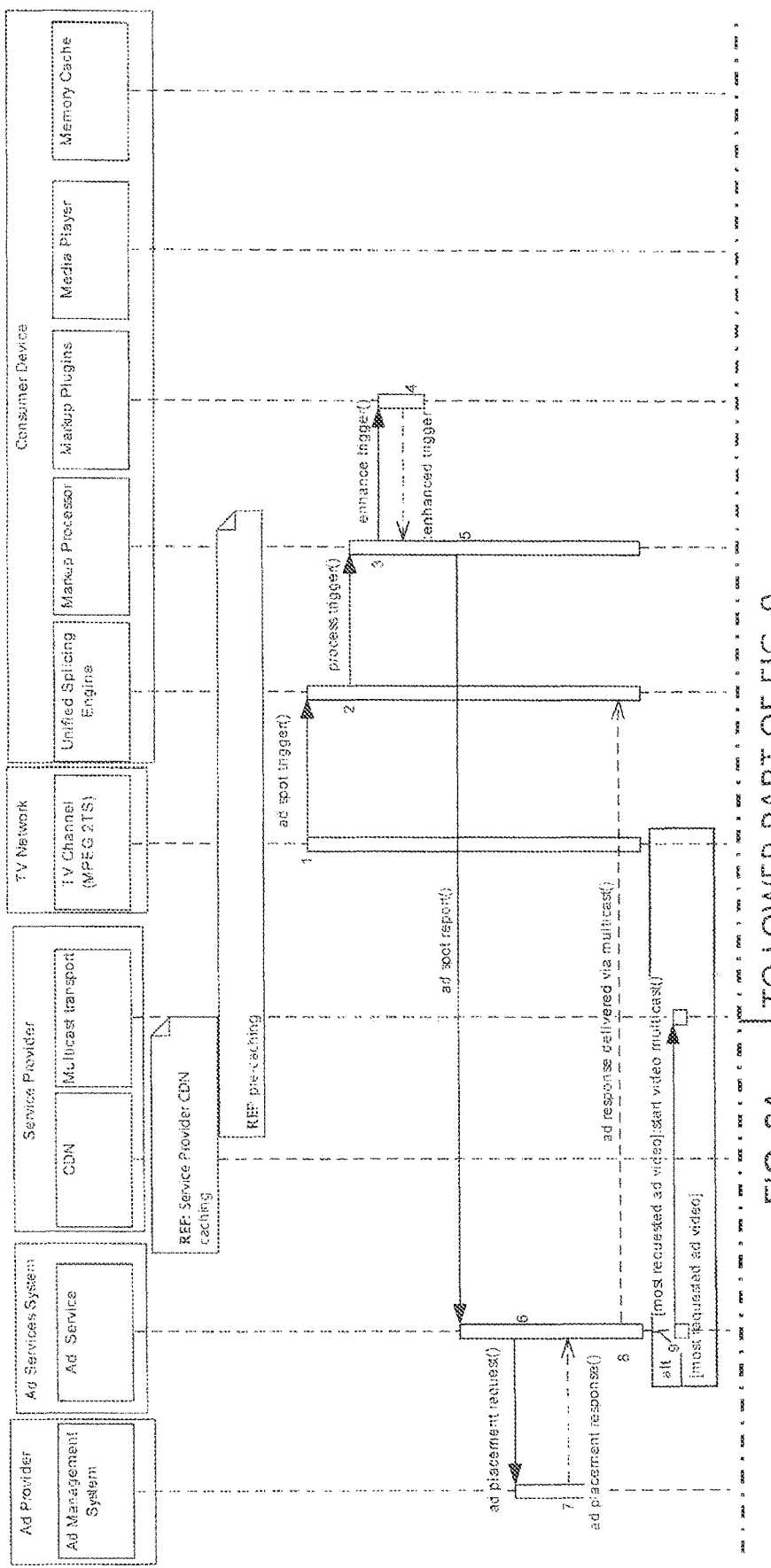
FIG. 9A ↓TO LOWER PART OF FIG. 9

FIG. 14A  ↓ TO LOWER PART OF FIG. 14

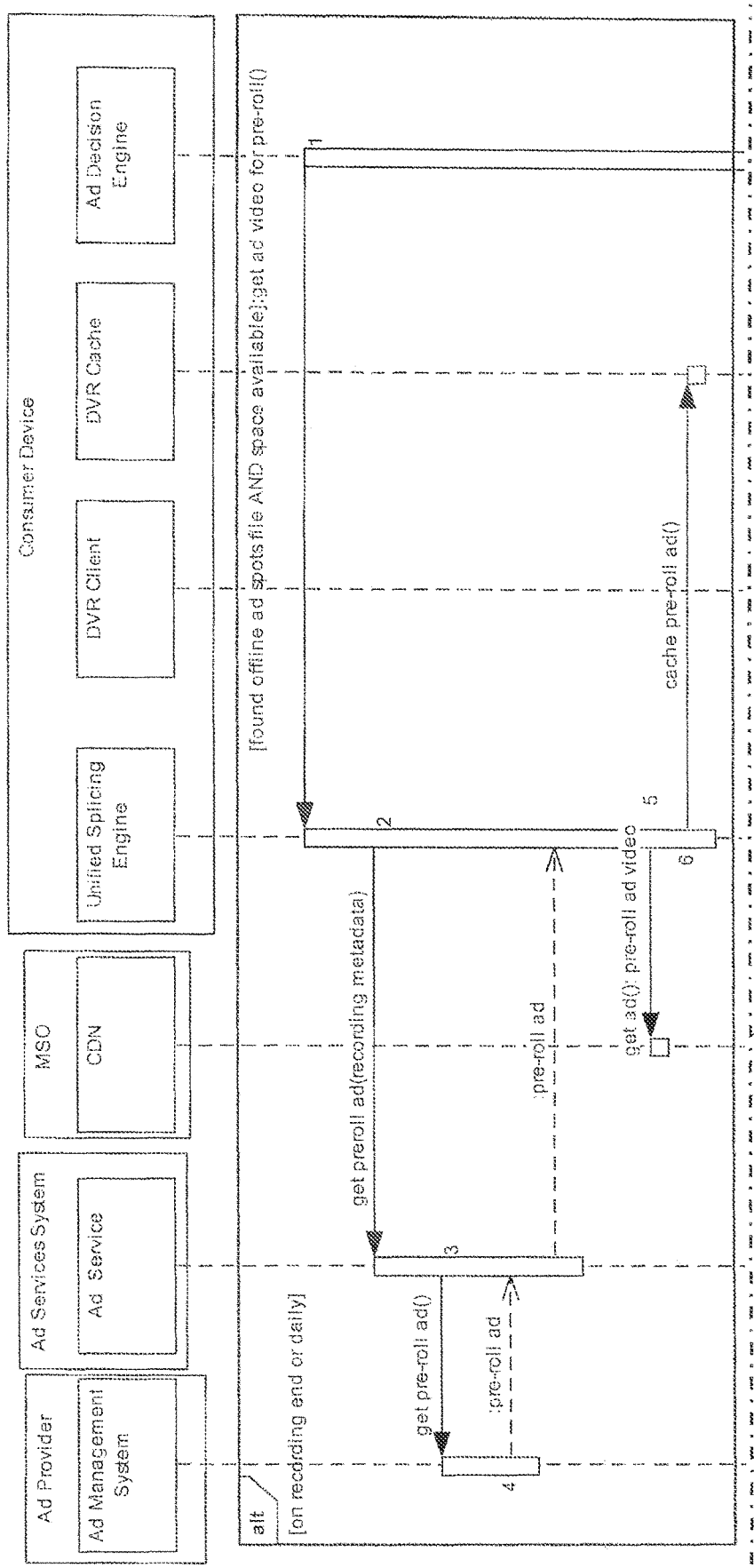
FIG. 15A   ↓TO LOWER PART OF FIG. 15

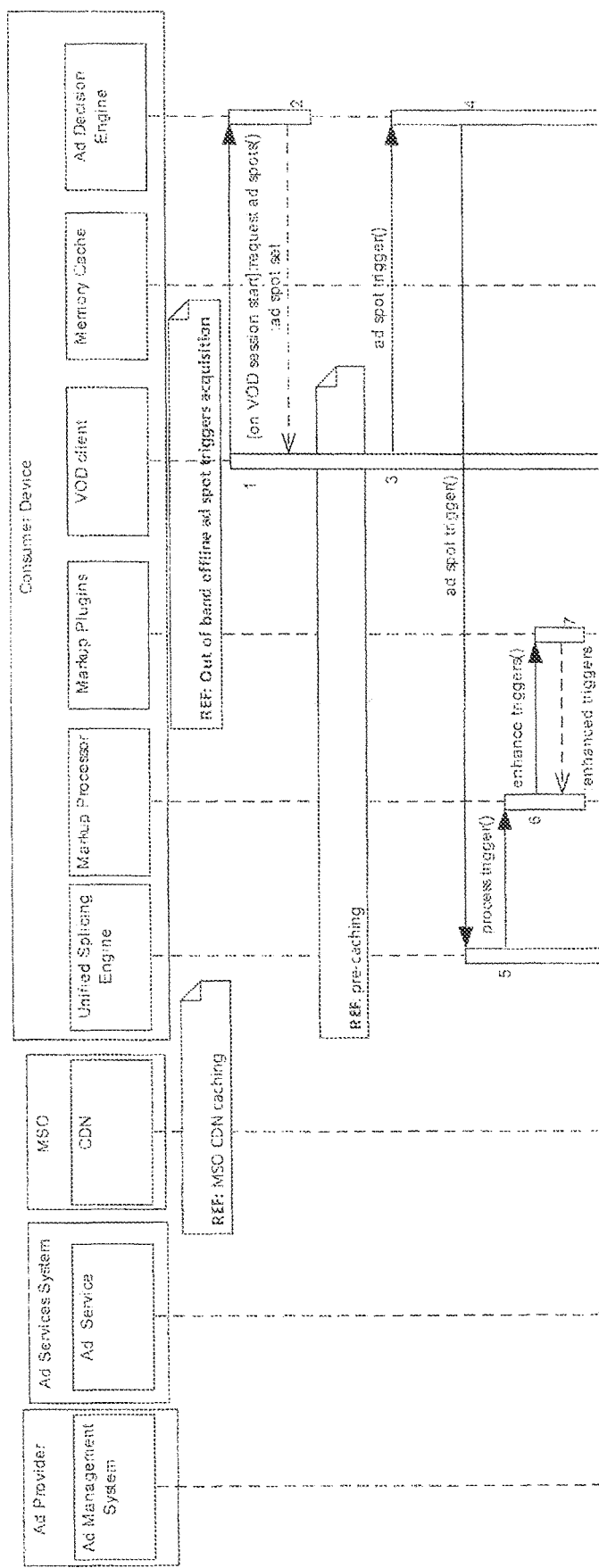
FIG. 19A ↓ TO LOWER PART OF FIG. 19

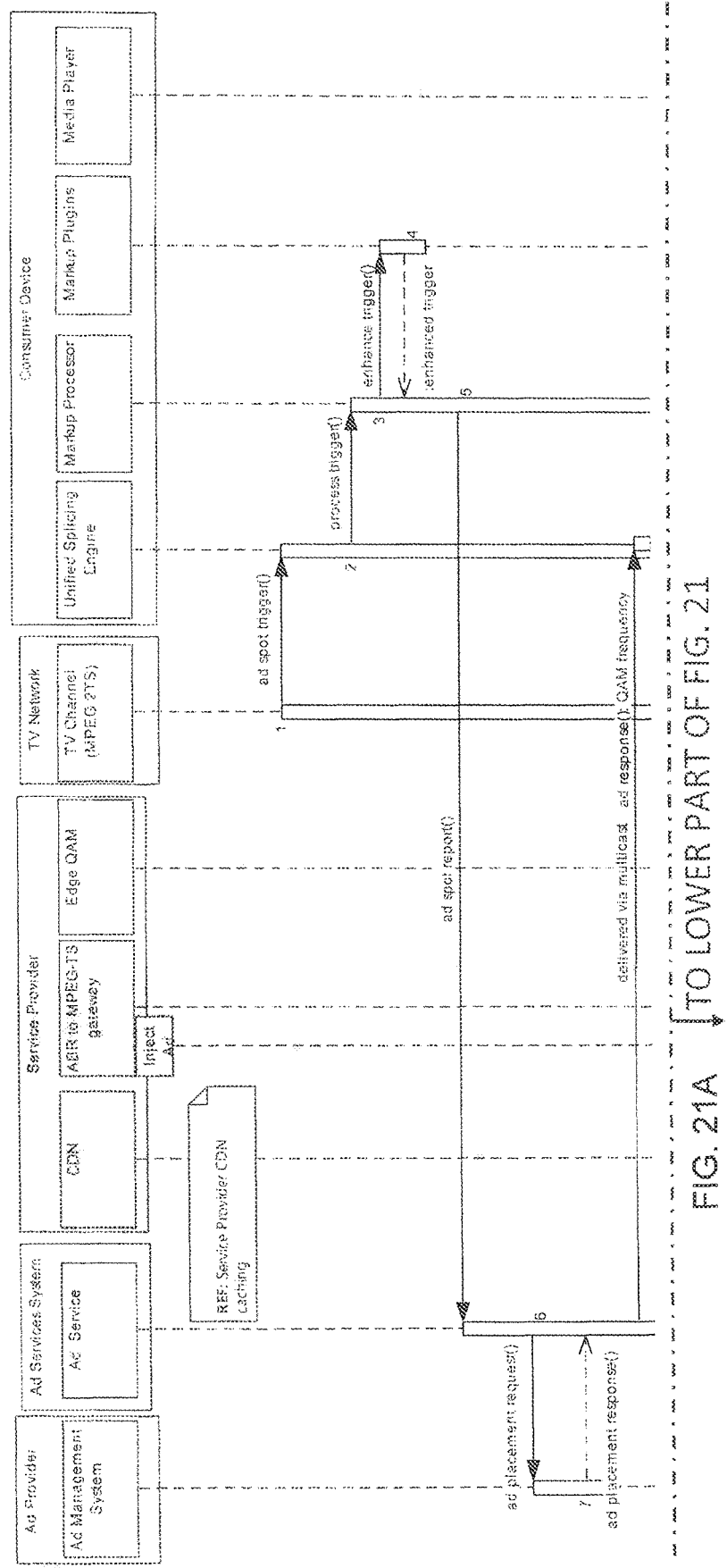
FIG. 21A  [TO LOWER PART OF FIG. 21]

SYSTEM FOR UNIFIED AD DELIVERY TO CONSUMER DEVICES WITHIN SERVICE PROVIDER NETWORKS

REFERENCE TO RELATED APPLICATION

This Application claims priority of U.S. Provisional Application Ser. No. 62/478,311 filed Mar. 29, 2017, the entire disclosure of which is hereby incorporated by reference.

BACKGROUND OF THE INVENTION

Video advertisement has become a major part of today's television experience. Video ads are inserted in the designated time slots during live broadcast, captured and reproduced with video recorders along with the content video, inserted into video-on-demand playout, and into the playback of the recorded videos, as well as being used in other applications.

All these applications create a substantial advertisement market with high demand across the advertising landscape, and as such require mature technologies. Several technologies have emerged to support the above-discussed applications and to address the market needs. These technologies are targeted at supporting a very limited number of applications. Currently available technologies are not capable of supporting many or all possible applications simultaneously. Furthermore, each existing technology of inserting video advertisements into a content video is differently evolved to support custom or standard compliant advertisement management systems, analytics systems, targeted advertisement, video resolution and other aspects.

The present invention is aimed at unifying the insertion of the video advertisement into the content video by engaging various techniques including (but not limited to): abstracting from a specific advertisement management system, be it custom or standard; supporting video advertisement insertion into a wide variety of content videos including live broadcast, recorded videos (DVR (Digital Video Recorder), PVR (Personal Video Recorder), Network DVR), video on demand (VOD), pay per view (PPV), and over the top (OTT); abstracting from currently known methods of delivery of the content video and thus creating a plug-in based approach of supporting future methods of delivery of content video; supporting granular targeted delivery of the inserted video advertisements; and supporting targeting device groups of any size including individual targeting.

SUMMARY OF THE INVENTION

The present invention discloses a system for multiple ad delivery placements to consumer devices in a unified method within managed service provider networks. Consumer devices may be set-top boxes or any device on a network that is capable of video content display. The present invention enables delivery and insertion into video content of advertisements. Advertisements may be delivered and inserted into any combination of broadcast or linear TV networks, video-on-demand (VOD) content streams, DVR (Digital Video Recorder) capable boxes with local storage, Cloud based DVR content streams, live-to-VOD recordings (also known as Catch Up TV), and streams delivered over IP (Internet Protocol) networks inclusive of OTT (over-the-top) streaming services (OTT or IP streaming services are those content service types as delivered by Amazon Prime Video, Netflix, and YouTube as representative examples) through a common, unified system design enabled by the present invention. The system enables the delivery of targeted advertisements to one or more consumer devices such as set-top boxes where ad content is intelligently delivered (through one or more mechanisms) to the set-top boxes from an IP network based on targeting criteria determined by a third-party ad management system. Additionally, the system is able to support targeted advertisements based on targeting criteria determined by analyzing data collected across both the IP-connected devices outside the service provider network and/or those devices within the service provider network.

The system of the present invention is capable of performing the following functions:

Providing real-time, targeted video advertisements delivery to one or more consumer devices across multiple content delivery services accessible to viewers individually or concurrently.

Supporting a unified system that can simultaneously target video advertisement delivery across linear-TV, DVR based devices, Video-On-Demand (VOD), Cloud based DVR or network DVR, and IP-based delivery of content.

The system supports delivery of targeted video advertisements to the managed service provider devices including those based on QAM (Quadrature Amplitude Modulation), IP, QAM/IP, IP-only, or set-top box devices with or without a local hard-drive, as well as any device with support for IP network connectivity operating within a service provider network.

The system supports efficient IP delivery of video advertisements to service provider managed networks of consumer devices where the network consists of both IP and QAM distribution systems and managed consumer devices.

The system supports real-time targeted advertisements to all IP-connected devices and managed consumer devices, whose targeting criteria is based on data-collection and analytics across both managed service provider consumer devices and including, but not limited to Internet based devices such as mobile phones, tablets, personal computers, and more generally the IoT devices.

The system supports the insertion of video advertisements to large numbers of consumer devices in a network and bandwidth efficient manner by intelligently: 1) limiting the total number of requests made from consumer devices; 2) managing the distribution of requests to minimize overall network and bandwidth requirements while supporting real-time advertisement decisioning, targeting, and insertion to consumer devices; and 3) enabling support of real-time ad requests from consumer devices through the use of predictive analysis of network traffic, usage patterns, and the use of intelligent scheduling methods which include pre-staging of ad media assets.

BRIEF DESCRIPTION OF THE DRAWINGS

The drawings discussed below are provided to illustrate and not to limit the invention, wherein.

DETAILED DESCRIPTION OF THE INVENTED TECHNOLOGY

Definitions

Figure 1:
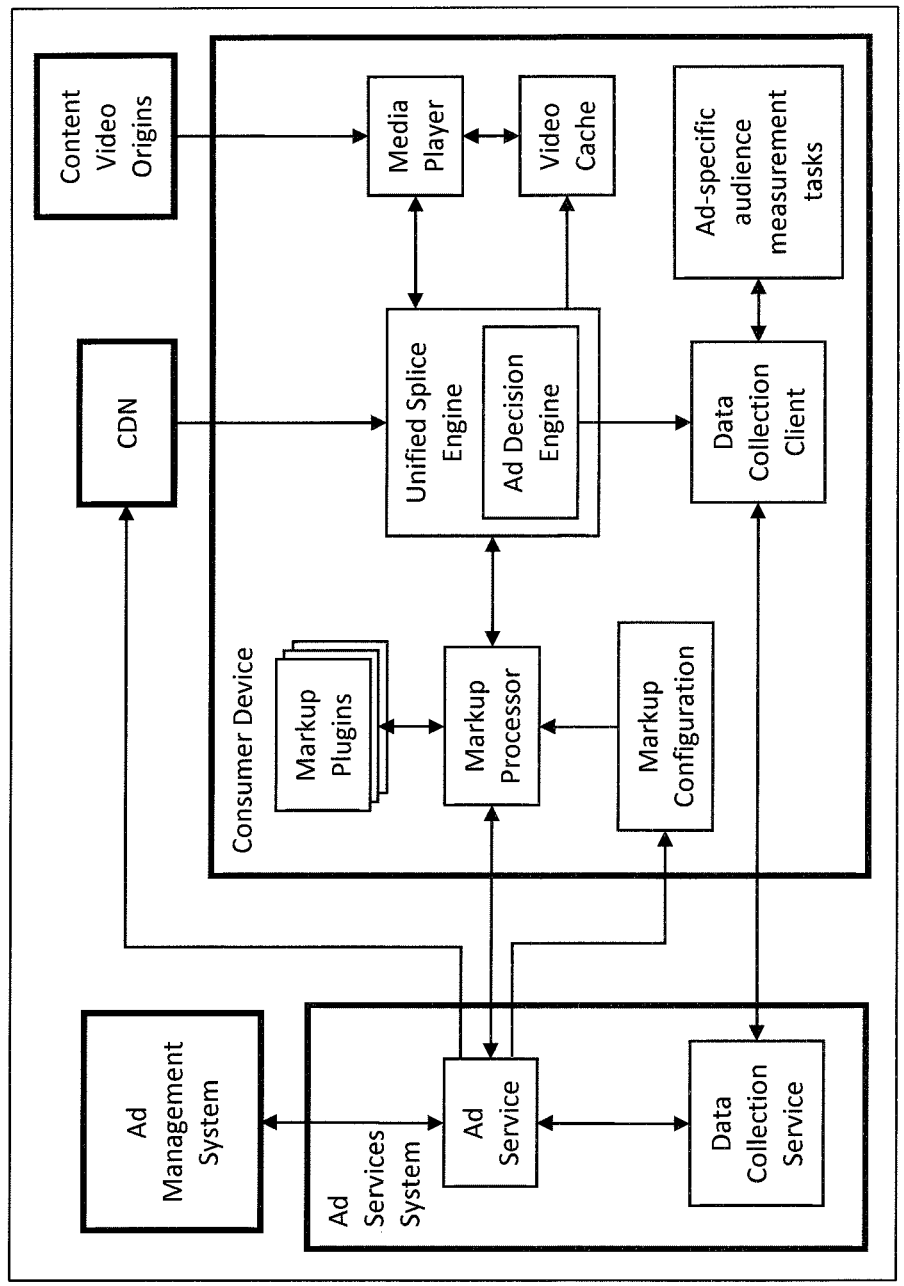
FIG. 1 is a diagram of the general architecture of the system of the invention.

This section provides definitions of terms used to describe the invention. The terms defined here may not necessarily match definitions of the same or similar entities elsewhere.

Video (a content video) refers to a movie, program, sporting event, stream, etc. that constitutes the video that is specifically selected by the consumer.

Ad (an advertisement video) refers to a video that promotes a product or service to a consumer and that is shown to the consumer in addition to the content video. An ad video is herein specifically differentiated from a content video in that it is an advertisement system, not a consumer, who selects a time for watching the advertisement.

System refers to a subject matter of the present invention.

Consumer Device is a device used or accessible to a consumer to watch content video.

CDN (Content Distribution Network) refers to an IP based network element that is used for storing and caching of video or ad media assets for efficient retrieval.

Delivery Technologies generally relates to a method of transferring a video from a CDN or ad serving device to a consumer device. Currently supported delivery technologies are listed below. Supported delivery technologies include:

QAM—Quadruple Amplitude Modulation.
SDV—Switched Digital Video.
IP—Internet Protocol network.
DOCSIS—Data Over Cable Service Interface Specification.
Broadcast—delivery to the entire population of consumer devices.
Multicast—delivery to a subset of the entire consumer device population.
Unicast—individual delivery to a single consumer device.
Ethernet—Ethernet interface.
Wi-Fi—Wi-Fi interface.

Ad Spot refers to a timeframe within a content video that is designated for displaying ad videos or streams. For the purpose of the description of the present invention, the following types of ad spots are defined: Live Ad Spot is an ad spot whose metadata is attached to a live broadcast and which arrives to a consumer device responsible for displaying a video only a few seconds before the ad spot starts. Recorded Ad Spot is an ad spot whose metadata is stored in the system along with a recorded video the ad spot is associated with. If a live video is recorded and if its associated live ad spot is recorded too, then said associated live ad spot becomes a recorded ad spot. Generated Ad Spot is an ad spot whose metadata did not come to the system with an original video stream but is artificially generated by the system. A generated spot is first produced for a video when the video is first displayed to the consumer. If a video is recorded by a consumer and its associated generated ad spot is recorded too, then said generated ad spot becomes a recorded ad spot.

Ad Spot Attributes refers to a set of attributes that characterize an ad spot. For the purpose of the present invention the term "Ad Spot Attributes" is used interchangeably with "Ad Spot Metadata".

The primary attributes of an ad spot are start time, duration, origin, and other attributes available in the ad trigger signaling the ad spot. The start time attribute indicates at which moment of time an ad spot starts relative to a content video timeline. Duration indicates the length of a time frame allocated for the ad spot. The origin attribute refers to an origin associated with the that ad spot.

The extended attributes are provided by ad spot plugins on a consumer device and by the Ad Services system on the server side.

Ad Trigger refers to a designated markup associated with a video, that carries ad spot's primary attributes and event timing.

Ad Impression refers to a complete or incomplete playback of the individual ad video.

Video Sequence refers to a timed sequence of content video fragments and inserted ad videos rendered or displayed by a consumer device and consequently watched by a consumer.

Plugin refers to a software component that carries a specific type of functionality and connects to a system using an interface exposed by the system. A said interface is specifically designed to provide said specific type of functionality to a system. From the perspective of the system all plugins that provide the same specific type of functionality operate identically.

Pre-roll refers to an ad video inserted at the beginning of the content video. The content video starts after ad video playout is completed.

Mid-roll refers to an ad video inserted at some point in the middle of the content video, that is not in the beginning and not in the end. Each content video may have many mid-roll inserted ad videos.

Post-roll refers to an ad video inserted at the end of the content video.

DAI refers to a digital ad insertion process which is disclosed by the method of the invention.

ADI refers to CableLabs Asset Distribution Interface.

General System Architecture

Reference is made to FIG. 1, which is a diagram of a general architecture of the system of the invention. This figure represents the high-level system architecture with generic content source components such as "Origins" as opposed to specific use-case applications where each component is represented by its relevant instantiation, such as CDN or TV VOD back-end as examples of more specific Origins further described below. Individual use-case applications are described below, with each use-case application described further by its associated system architecture and specific components replacing those illustrated in the generic components depicted in FIG. 1.

System Description

This section provides a description of the components of the present invention depicted in the diagram of FIG. 1. Ad Management System is a system responsible for advertisement campaign management, reporting, targeting and ad video selection to be displayed to a consumer. The Ad Management System is external to consumer devices. An Ad Management System does not constitute part of the present invention and hence its function is not disclosed.

Ad Services System is a set of components and adapter modules providing advanced advertising services for a provider network of consumer devices. It is based on the AMS (Advanced Messaging Solution), a messaging and integration hub that hosts multiple components including components of the present invention. The AMS is a product of DevelopOnBox LLC d.b.a. Zodiac Interactive and is used as an example host for server-side components. This is shown in FIG. 1 as an Ad Service. The Ad Services System supports the following functions of the present invention and is responsible for the following tasks:

Provisioning of the Markup Configuration to one or more Consumer Devices.
  Adding server-side generated extended attributes to ad spot metadata.
  Processing and delivering ad placement requests from a Consumer Device to an Ad Management System.
  Filtering out non-applicable ad videos and origins from the response of an Ad Management System.
  Processing and Delivering responses from an Ad Management System back to a Consumer Device.
  Retrieving and processing impression statistics from a Data Collection Service.
  Reporting and processing impression statistics to an Ad Management System.
  Retrieving targeting criteria from an Ad Management System.
  Server-side pre-caching of ad videos for targeted consumer devices or groups.
  Managing and controlling a Consumer Device's ad video pre-caching behavior.
  Seamless support of multiple Ad Management Systems simultaneously. Integration to back-end of Ad Management systems is through one or more plugins. Plugins of the Ad Services System include:
  VAST
  SCTE-130
  Other methods of connecting to an Ad Management System can be enabled by implementing a corresponding plugin.

Multi-Service Data Collection Service is responsible for receiving data collection reports from Consumer Devices according to selection criteria or configuration rules. The Data Collection Service supports functionality of the present invention.

Origins (Content Video Origins) is a set of all supported sources of content videos and/or ad videos. The block representing Origins in the diagram of FIG. 1 is intentionally positioned partially overlapping a Consumer Device 14 in order to emphasize that an Origin can be either in a Consumer Device or external to it. The present invention is agnostic to the physical placement of an Origin. For the purpose of description of the present invention, the Content Distribution Network, (CDN) defined below, is an important embodiment of an Origin used as a part of the ad video delivery mechanism and as such is shown separately. A list of supported origins is provided below, wherein each Origin is available to the system via a corresponding origin plugin. The list is not exhaustive, and other origins can be enabled by providing respective origin plugin. Supported origins include:

Linear, also known as Live TV, is an origin that broadcasts videos to all interested consumers simultaneously at a time scheduled by a video network.
  Video On Demand (VOD) is an origin that keeps a stock of recorded videos on the VOD servers and allows a video to be watched at a time selected by consumer.
  Digital Video Recorder (DVR), also known as Personal Video Recorder (PVR) is an origin that stores on a local hard drive previously recorded videos and that allows a video to be watched at a time selected by consumer.
  Local storage is a storage device such as HDD, SSD, etc. closely associated with and controlled by a consumer device or by the Ad Services System.
  Network DVR (NDVR) is an origin that keeps previously recorded videos in the server or on a Cloud network and allows a video to be watched at a time selected by consumer.
  USB is a video that is available for display on a consumer device from another device that is connected to the said consumer device via a USB interface.
  Catch-Up TV is an origin that keeps recently recorded linear video streams and allows a recorded video to be watched at a time selected by consumer.
  RAM (Random Access Memory) or Cache is a random access memory of a consumer device that may store videos or portions or elements of videos.
  Flash is a flash memory of a consumer device.
  CDN (Content Distribution Network) is a content delivery network that manages the efficient storage and distribution of videos, and is responsible for video delivery, potentially in chunks, to a consumer device over IP (Internet Protocol) networks.
  Web Service is any server or other device that can relate to a consumer device via an IP network.
  Cloud Service refers to any Cloud based infrastructure that can provide video streams via an IP network.

Unified Splice Engine is a core component of the present invention responsible for the Consumer Device side orchestration of all activities related to the processing or seamless splicing of one or more video origins, under the control of Ad Decision Engine and Markup Processor, into a single video playout at designated time events. The unified splicing engine utilizes a video cache to optimize multi-origin video splice events and ensures proper temporal ordering of all video playout in conjunction with a Media Player unit.

Ad Decision Engine is an internal component of the Unified Splice Engine responsible for selecting an exact ad video to be played at each specific ad spot.

Video Cache is used by the Media Player to achieve seamless multiplexing and temporal ordering of multiple content videos and ad videos into a single video playout. The Unified Splicing Engine may provide (through DMA (Direct Memory Access) operations) origins with direct memory access to the Video Cache for direct delivery of the video chunks into the cache while the Unified Splicing Engine continues its orchestration (under control logic from the Ad Decision Engine and markup meta-data) of splicing origin video components available from the video cache into a unified video playout stream for the Media player unit. An important embodiment of the Video Cache used in the present invention is a DVR Cache which uses a local storage on a DVR-enabled consumer device to cache ad videos.

Multi-Service Data Collection Client is a client-side component of the data collection subsystem. It is responsible for receiving all relevant events from all client-side components participating in a data collection process, pre-aggregating said events according to its own configuration, and delivering resulting collected data to the Data Collection Service.

Markup Processor is a client-side component designated to manage and process ad spot metadata and request ad videos from an Ad Services System. The Markup Processor monitors ad triggers associated with a content video which a consumer device is about to play or is playing. The Markup Processor also collects and processes enhanced ad spot attributes and primary ad spot attributes. Collectively the primary ad spot attributes and the enhanced ad spot attributes form enriched ad spot metadata. Further, the Markup Processor supports plugin-based ad spot metadata enrichment and relays ad placement requests from Ad Decision Engine to an Ad Services System. The requests are enriched with ad spot metadata. This processor also receives replies from the Ad Services System and relays these replies to the Ad Decision Engine.

The Markup Processor is associated with multiple Markup plugins. These plugins include, for each consumer device, an ID plugin, a hardware characteristics plugin, an EPG (Electronic Program Guide) programming metadata plugin, and an ADM (Advanced Data Mining) metadata plugin. Each consumer device has a unique ID plugin. Depending on the consumer device this can be a MAC address, IP address, serial number, UUID, and other values uniquely and permanently identifying a consumer device. The ID provided by this plugin can be an atomic value sue as set forth in the prior sentence or can be a composite value consisting of multiple atomic values.

The hardware characteristics plugin of a consumer device, this plugin provides hardware characteristics that can help an Ad Management System to better select ad videos for a consumer, or targeted group to which the consumer belongs. Such hardware characteristics may include screen resolutions, available memory, CPU speed, size of the local storage on a consumer device, etc.

The EPG programming metadata plugin enriches the ad spot metadata with information about the specific program being watched with which a given ad spot is associated. An example of EPG programming metadata may include program title, program description, channel name, network name, program parental rating, program viewer rating, etc. The specific set of EPG programming metadata attributes is defined by the data available on a consumer device and is configured for this plugin.

The ADM metadata plugin enriches the ad spot with metadata retrieved from a third-party Ad Management System. The metadata format is an enumeration of one or more self-describing structures. In the event that there are multiple ADM systems, a plugin will exist for each third-party ADM system. Other methods of ad metadata enrichment can be supported by adding more plugins to the Markup Processor.

Markup Configuration includes the list of allowed Origins. If this list is empty, then all Origins that a Consumer Device is capable of supporting are allowed and must be engaged. Otherwise, if this list is not empty, then only specified Origins are allowed and must be engaged. The Markup Configuration also includes rules for producing generated ad spots. These rules are as provided by the Ad Service. The supported states of plugins, also forming part of the Markup Configuration, include active, disabled, remove, update, and download (applicable to a newly available plugins).

Media Player is a component responsible for the seamless playout of all content videos and ad videos in the order specified by the Ad Decision Engine.

Plugins of the Media Player for video playback include:
    QAM video delivery;
    Switched Digital Video (SDV) based QAM video delivery;
    UDP-based video delivery;
    Local Memory or Buffer;
    HTTP Live Streaming (HLS);
    MPEG-DASH;
    Real-time Transport Protocol (RTP);
    Real-time Streaming Protocol (RTSP).

It should be noted however, that other video playback protocols can be supported by adding corresponding plugins to the Media Player.

System Operation and Ad Delivery Use-Cases

The present invention allows for arbitrary matching of any content video delivery method with any method of ad video delivery. For example, inserting ad videos stored or cached in the consumer device local storage such as HDD/SSD into live content streams such as QAM Live TV is highly viable due to great reduction in the concurrent use of the shared bandwidth.

One of the essential aspects of the present invention relates to a capability to simultaneously provide multiple methods of ad video insertion within a unified system architecture. For example, inserting ad videos into live stream can be performed using multicast delivery for those consumer devices that do not have local storage and share the same network bandwidth used to deliver ad videos, e.g. non-DVR set-top boxes connected to the same physical network equipment. Simultaneously, devices with local storage may have ad videos inserted from the local storage of the consumer device. In addition, devices receiving the same live stream via Internet, i.e. network not controlled by service provider, may have ad videos inserted from external CDN using unicast delivery. Finally, content delivered over IP may also be converted to QAM delivery for broadcast or multicast through an available service provider network infrastructure.

The system invention implements the following use-cases in a fully unified method:

- Ad insertion into live video stream. Ad videos are stored or cached in the consumer device's local storage.
- Ad insertion into live video stream. Ad videos are delivered via multicast stream sessions. The consumer device selects which session to join based on directions received from the Ad Services System.
- Ad insertion into live video stream. Ad videos are delivered via a unicast stream session. Each consumer device will receive a dedicated unicast stream with an ad video.
- Ad insertion into the playback of the recorded video stored locally in the consumer device, e.g. local DVR recording. Ad videos are stored or cached in consumer device local storage. Here, DVR video playback includes live video recorded in a temporary buffer with replay capability (live TV pause).
- Ad insertion into the playback of the Cloud DVR recording or Network DVR recording. Ad videos are stored or cached in the consumer device local storage.
- Ad insertion into the playback of the Cloud DVR recording or Network DVR recording. Ad videos are delivered via a unicast stream session from the CDN.
- Ad insertion into the playback of the Cloud DVR recording or Network DVR recording. Ad videos are delivered via a unicast stream session directly from the Ad Services or Management System.
- Ad insertion into the playback of the Live-to-VOD recordings. Ad videos are stored or cached in consumer device local storage.
- Ad insertion into the playback of the Live-to-VOD recordings. Ad videos are delivered via a unicast stream session from the CDN.
- Ad insertion into the playback of the VOD content video. Ad videos are stored or cached in the consumer device local storage.
- Ad insertion into the playback of the VOD content video. Ad videos are delivered via a unicast stream session from the CDN.
- Ad insertion into Live stream. Solution for QAM-based set top boxes with no broadband connectivity.

The following sub-sections include, but are not limited to, use-case applications of the system invention.

In the following subsections, all requests, responses, and data are being transmitted through connected intermediate components illustrated in the associated architecture. For example, if the Ad Decision Engine is requested to send a request to the third-party Ad Management System, the actual message is going through the Unified Splice Engine, Markup Processor and Ad Service. Unless explicitly stated otherwise, the response travels in the reverse order.

Use-Case 1: Live-TV Ad Insertion with Ad Assets Stored or Cached on Consumer Device with Local Storage Such as Hard Drive (HDD)

This section discloses an example use-case application of the present invention for inserting ad videos into live TV streams watched simultaneously by a large population of set-top boxes with a DVR local hard drive.

Hundreds of thousands and even millions of consumers are watching TV at the same time during peak hours. Ad placement opportunities are announced approximately 15 seconds or less before ad block times on each channel (SCTE-35 trigger in MPEG-TS). Ad triggers may also be unreliable. Viewers watching the same channel will have an ad spot at the same time. Ad blocks on different channels may be scheduled for the same moment in time. In this situation, all viewers across all these channels have an ad spot displayed at the same time (and receive triggers at their STB 15 seconds or less ahead of ad spot). Currently available infrastructure is often incapable of supporting many individual targeted ad videos at the same time.

Figure 2:
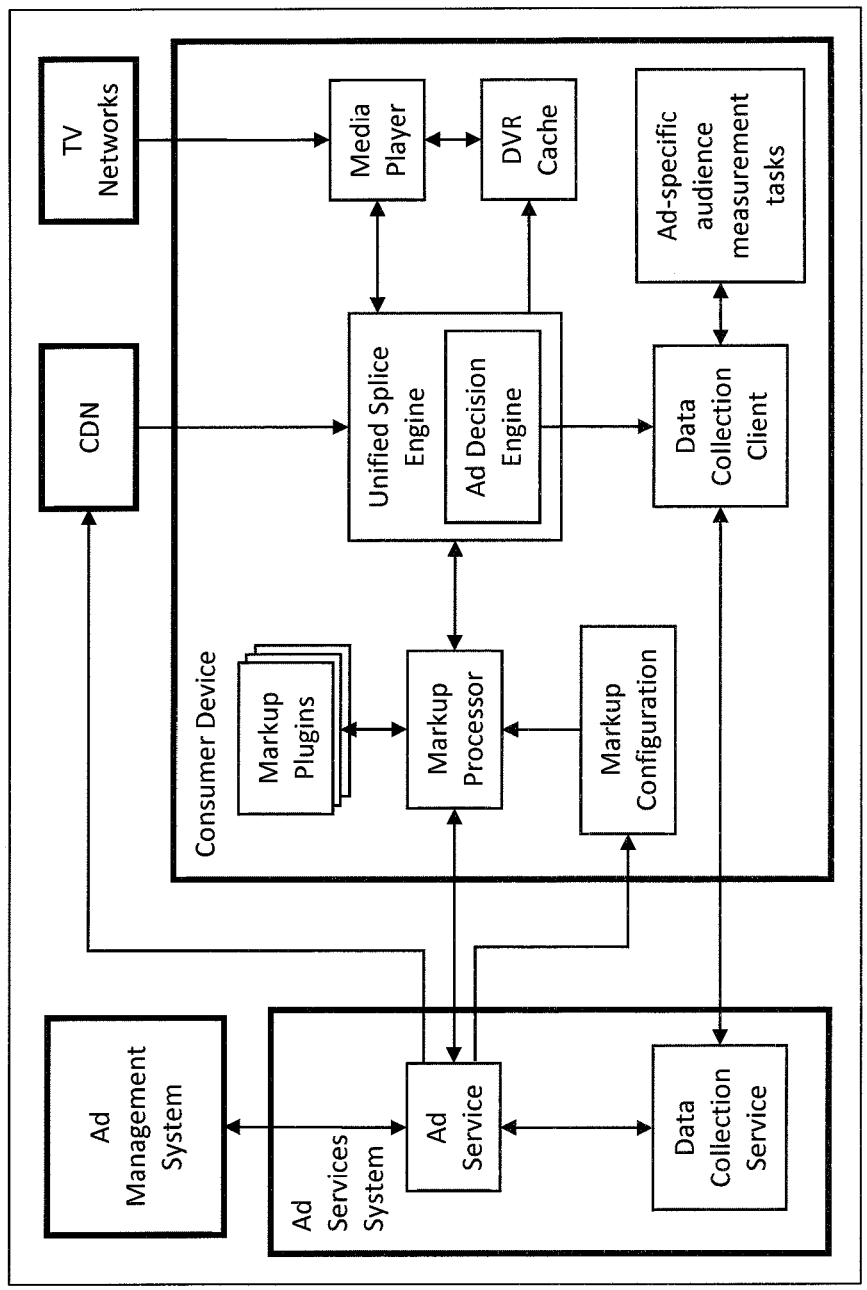
FIG. 2 is a diagram of Use-Case 1 System Architecture: Live-TV ad insertion with ad assets stored or cached on the consumer device with local storage such as hard drive (HDD).

Reference is made now to FIG. 2, which illustrates one embodiment of the system architecture with an accompanying detailed explanation of each flow provided below in conjunction with the sequence diagrams. The Ad Management System is provided with properly transformed audience measurement data to ensure sensitive data assets are controlled by the service provider from the entire STB footprint on an ongoing basis. The existing data collection mechanism is reused to collect required data such as what program is played on what channel, when it is being watched, and on what set-top box.

Set-top boxes are allowed to request ad videos ahead of time based on a configurable period of time. In this respect, each set-top box can periodically (once in an hour, for example) request a list of the most anticipated ad videos from the Ad Management System for the next 24 hours, or some other configurable frequency as determined by network conditions and available transports.

The Ad Service must monitor such requests, identify the same ad videos, and initiate caching of the most requested ad videos. The response from the Ad Management System to the STB request for the list of ads allows the proxying Ad Service to identify the same ad assets scheduled for different set-top boxes. The response from the Ad Management System also contains targeting information (see below).

The Ad Service commands DVR STBs to cache ad videos locally on a hard drive. The Ad Services System may pre-cache videos on the CDN for scheduled delivery to DVR STBs.

The Ad Management System is notified of the upcoming ad spots from the Zodiac Ad Services System. Based on the audience measurement data and the current state of the ad campaigns, the Ad Management System responds with an identification of the ad videos to be played and targeting rules allowing STBs to use/apply these rules to the targeting information provided above and select an appropriate ad video for insertion into the ad spot.

The Ad Management System should introduce and poll ad inventory API call to respond with the list of the creative-ad inventory for pre-caching based on the campaign metadata and EPG programming metadata passed in the request. In order to reduce number of the VAST ad requests/responses, the Ad Management System should introduce a bulk ad request for the entire STB range returning creative ad[id] ID for each STB in the requested range. It is expected that the IDs will be encoded in the most compacted form possible (for example using bit-masks). It is expected that the bulk ad request call will offer the same ad avails previously provided by the ad inventory poll call. The bulk ad request call, however, will allow for 1:1 STB targeting and tracking, even with the limited ad inventory available through pre-caching.

The Ad Services System delivers targeting rules and multicast ad video playbacks (see below) based on optimal delivery schedule to the DVR STB population for local storage. DVR STBs play locally cached ad videos from the hard drive, if the ad video is available.

Based on configurable rules and control of the Service provider, all STBs report ad impressions and associated user actions (e.g. tune away and trick modes) as enabled and required. An enhanced data collection mechanism that supports Service provider controls of data collection and distribution is utilized. Reporting ad tracking can be accomplished either by the STB devices using AMS as a proxy or by AMS backend performing tracking mapping on behalf of the STBs. In the latter case tracking requests are to be expanded by Ad Management System to include the encoded ad impression timestamp if necessary.

Audience Measurement Flow

Figure 3:
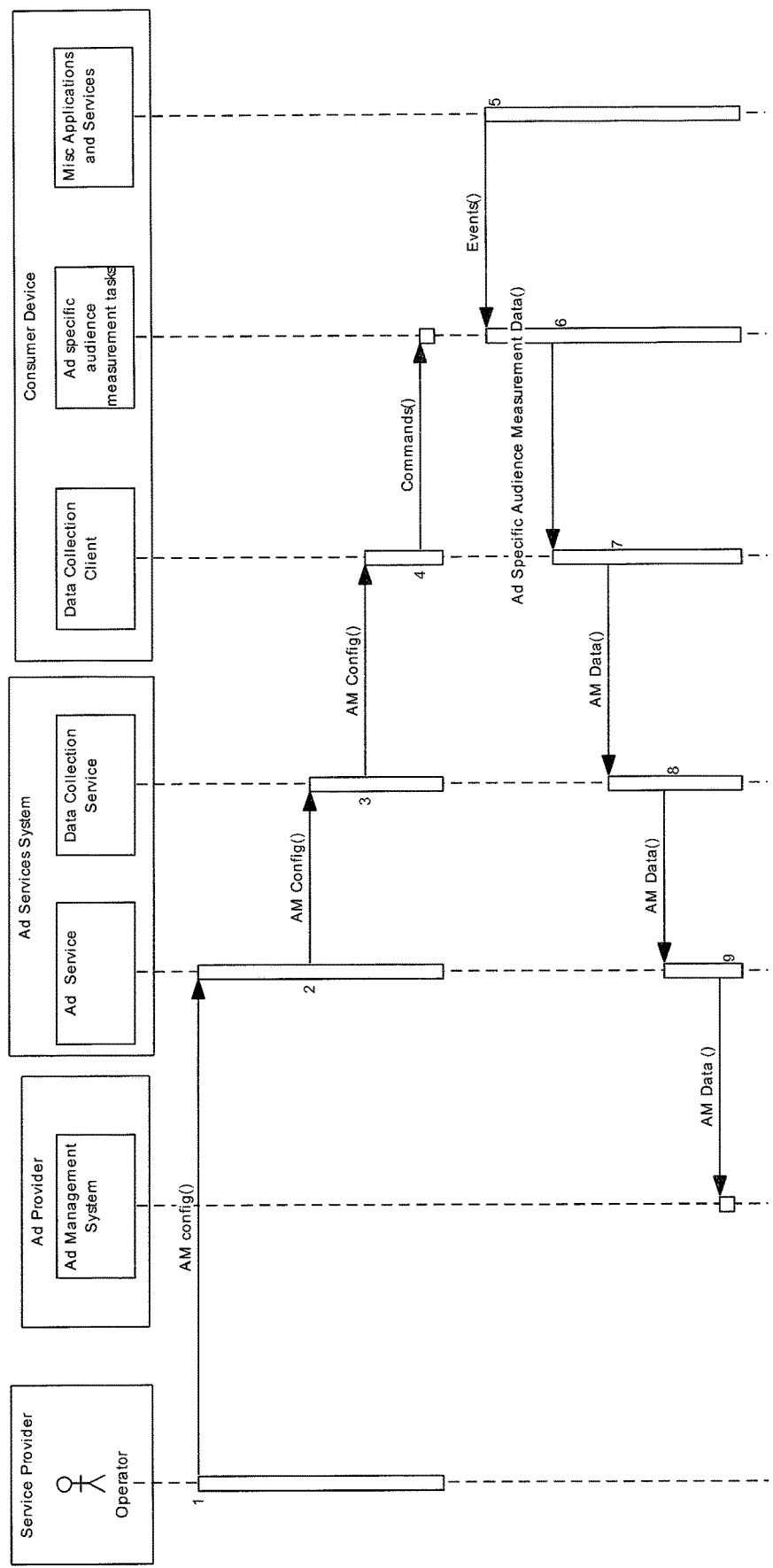
FIG. 3 is a diagram of Use-Case 1 illustrating Audience Measurement Sequence.

Reference is made to sequence diagram of FIG. 3, which represents the flow of events illustrating audience measurement flow configuration and data collection.

Service provider configures audience measurement via Ad Service Web UI to control privacy and data entity transformation rules that enable the Service provider control of data delivery in the Ad Management System. Ad-specific tasks (scripted plugins) of the Data Collection Client collection require audience measurement data and delivery to the Ad Services System. The Ad Management System utilizes this information along with other kinds of information received from the service provider to build a profile for each set-top box.

Caching Flow

Figure 4B:
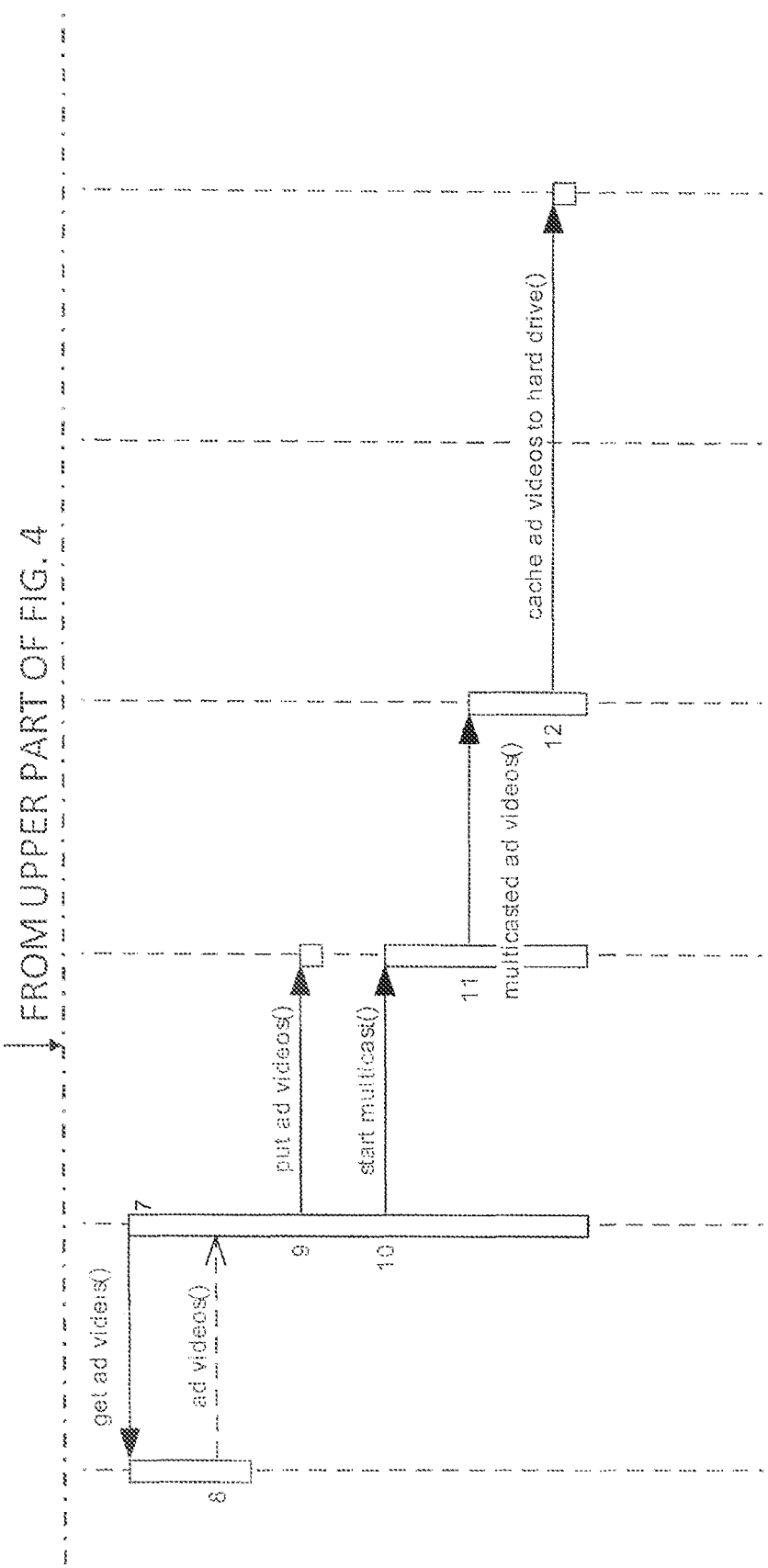
FIG. 4 is a diagram of Use-Case 1 illustrating Caching Operation Sequence.

Reference is made to the sequence diagram of FIG. 4, which represents the flow of events related to the caching of the ad assets on the local PVR hard drive. The Ad Decision Engine on each set-top box, in conjunction with the Ad Services System, periodically requests the Ad Management System to provide a list of ad videos that are mostly anticipated to be shown on the STB currently in use during the next configurable period of time, e.g. 24 hours. Multiple requests can be issued to the Ad Management System for different EPG programming items.

The Ad Management System responds with a list of ad videos to the Ad Services System. The Ad Services System parses the response, collects the list of ad videos for the entire STB population, and downloads ad videos from the Ad Management System and stores them on the CDN. Furthermore, the Ad Services System prioritizes ad videos for caching on DVR boxes from the Ad Services System, and provides DVR STBs with a list of ad assets that will be soon delivered through IP-multicast or IP-unicast (which are subject to network capabilities) for caching on the STB-local hard drive.

The Unified Splicing Engine allocates resources for caching video assets that are delivered via one or more transports (IP-Multicast and/or IP-Unicast). The Ad Service initiates multicast and/or unicast delivery of the ad videos to the DVR STBs and notify DVR STBs. Unified Splicing Engine downloads ad videos and caches them on the DVR hard drive. The user's recordings are of higher priority and as such may cause ad videos to be displaced and/or not stored on the hard drive. Fixed or dynamic allocation schemes or a combination of both approaches are possible.

Impression Flow

Figure 5B:
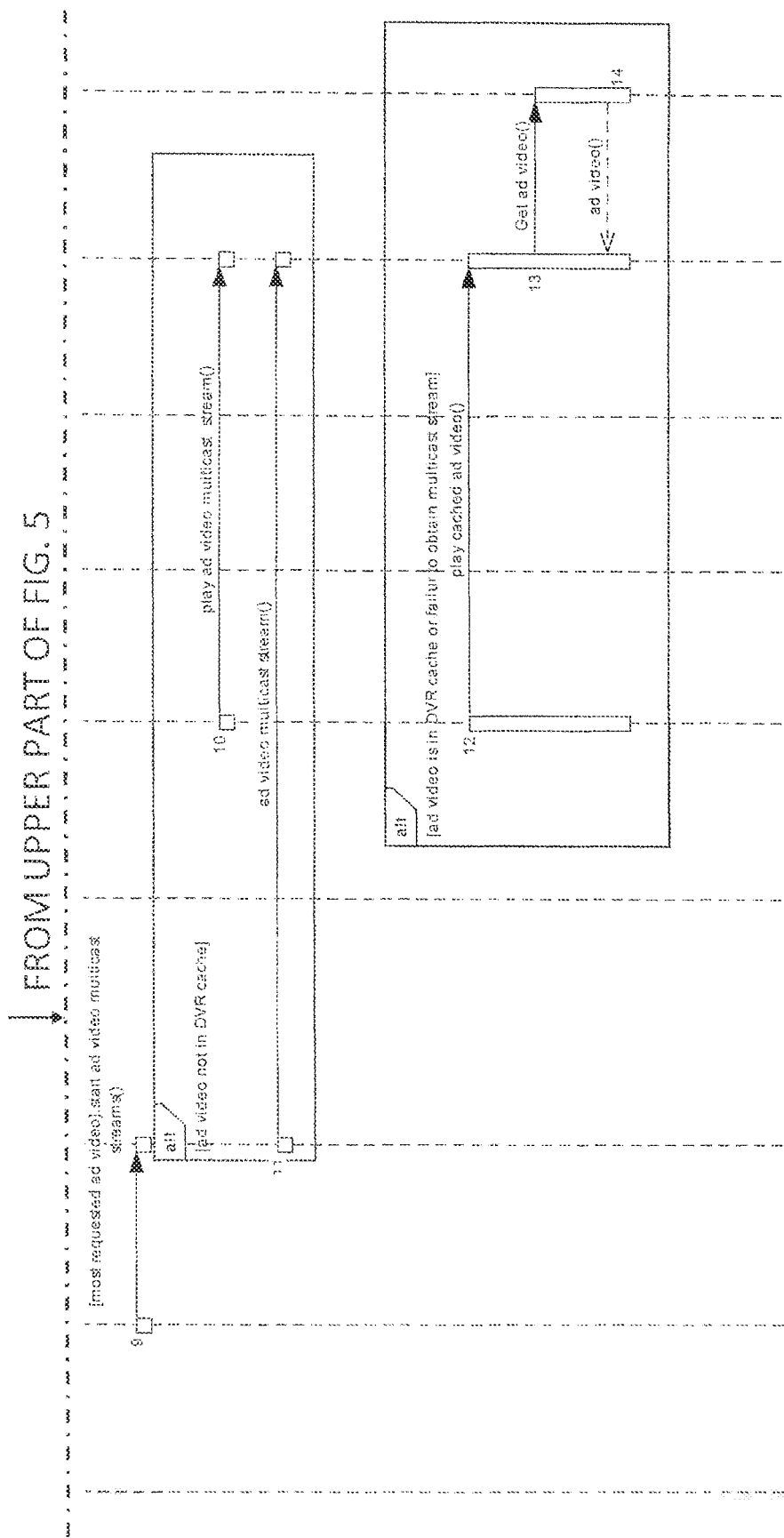
FIG. 5 is a diagram of Use Case 1 illustrating Ad Impression Sequence.

Reference is made now to FIG. 5, which is a diagram representing the sequence of events illustrating ad impression flow for the consumer devices with the local DVR cache. The diagram represents the flow initiated by the ad spot trigger. Similar flow may also occur on the scheduled content-boundary for a given channel.

The Unified Splicing Engine receives an original trigger from channel's MPEG-TS as it was inserted by the TV network. The Unified Splicing Engine uses a probability configuration as provided by the Ad Services System (see below) to decide whether the trigger will be relayed to the Ad Service. The probability configuration contains probabilities for a trigger to be relayed to Ad Services System for each live channel. If a trigger is conditionally delivered to the Ad Services System, the Unified Splicing Engine commands the Markup Processor to enhance the trigger with data required for the Ad Management System to respond to the ad spot opportunity and for the Ad Services System to calculate the probabilities (see below) using the Markup Plugins.

The Markup Processor relays the enhanced trigger to the Ad Services System. Based on the audience measurement and information contained in the enhanced trigger, the Ad Services System constructs a probability configuration for the STBs to relay future ad spot triggers back to the Ad Services System. The more consumers are expected to watch a channel, the less probability of relaying a trigger will be calculated by the Ad Services System for that channel. Only one trigger per ad spot is processed by the Ad Services System and the rest are ignored; the probability configuration is required to minimize the number of duplicate triggers relayed by STB population to the Ad Service.

The Ad Services System periodically delivers updated probability configuration to the STBs. The exact period of updates and method of delivery is decided by the Ad Services System as per necessary basis. The Ad Services System sends one or more requests that represent a batch or set of STB ad requests to the Ad Management System with the ad spot information (from the enhanced trigger).

The Ad Management System replies with the following information: What ad videos are required for delivery to a given ad spot on a given channel (pre-caching); What ad videos the DVR STBs are required to play; And what the fallback ad videos are in case the required ad videos are not cached on either CDN or DVR STB's hard drive.

The Ad Services System responds to the Unified Splicing Engine by inserting ad-specific triggers into MPEG-TS or through multicast/unicast delivery transports. Insertion of the ad-specific trigger can happen either as reaction to the cue-tone (real-time) or periodically (carousel). Changes in ad-specific triggers are expected predominantly on content boundaries. The Ad Services System initiates multicast ad video delivery and/or directed unicast ad video scheduled and delivered based on targeting criteria and dynamic network utilization state.

The Unified Splicing Engine on DVR STB checks if the required ad video is cached on the hard drive. If the video is cached, then the Unified Splicing Engine commands a Media Player to play that ad video, replacing the live TV stream. If the video is not cached or STB failed to acquire the multicast stream, the Unified Splicing Engine commands the Media Player to playa preferred ad video available from the ad video multicast.

Reporting Flow

Figure 6:
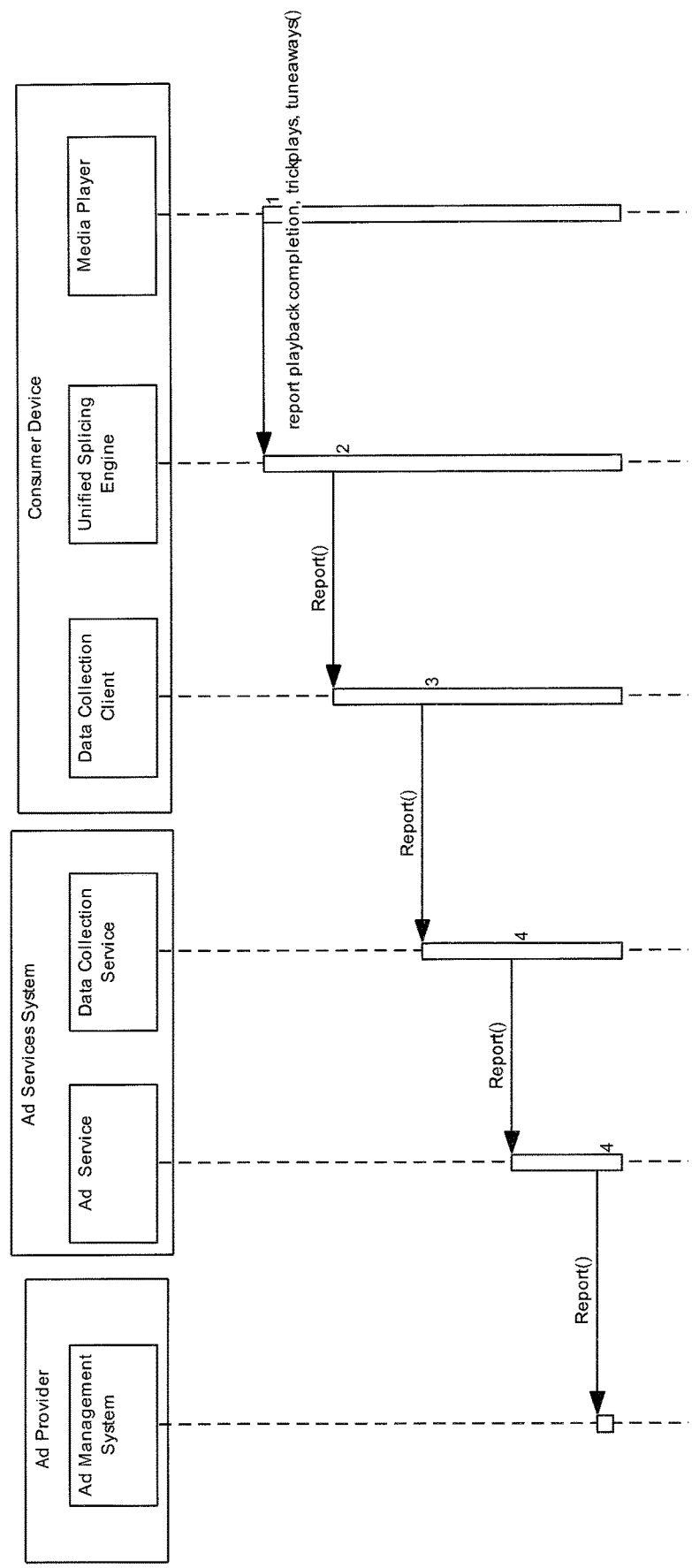
FIG. 6 is a diagram of Use-Case 1 illustrating Reporting Sequence.

Reference is made now to FIG. 6, which is a sequence diagram reporting flow. Upon completion of the ad video playback, the Media Player reports to the Unified Splicing Engine. The Media Player also reports all attempts to skip the ad video and tunes into another channel. It should be noted that the tune-in to another channel cannot be blocked by a non-skippable interval of the ad video. The Unified Splicing Engine generates appropriate data collection events and delivers them to the Ad Services System via a data collection mechanism which further processes the data according to the Service provider's requirements prior to third-party delivery. The Ad Services System reports collected data to the Ad Management System.

Use-Case 2: Live-TV Ad Insertion with IP Delivered Ad Assets

This section discloses an example use-case application of the present invention for inserting ad videos into live TV streams watched simultaneously by a large population of consumer devices without a local storage capable of caching a meaningful number of ad videos.

It is well known that hundreds of thousands and even millions of consumers are watching TV at the same time during peak hours or highly popular shows such as sports, etc. Consumer devices without a meaningful amount of local storage have no capacity for pre-caching a necessary variety of ad assets locally. Ad placement opportunities in live recordings are announced only a few seconds before an ad spot on each channel (SCTE-35 trigger in MPEG-TS). Ad triggers may also be unreliable. Drawbacks of currently available infrastructures regarding support of multiple individual targeted ad videos at the same time are known. All the viewers on the same channel will have an ad spot at the same time. Ad blocks on different channels may be scheduled for the same moment in time. Viewers across all such channels have an ad spot displayed at the same time (and receive triggers at their Consumer Devices a few seconds ahead of an ad spot).

Figure 7:
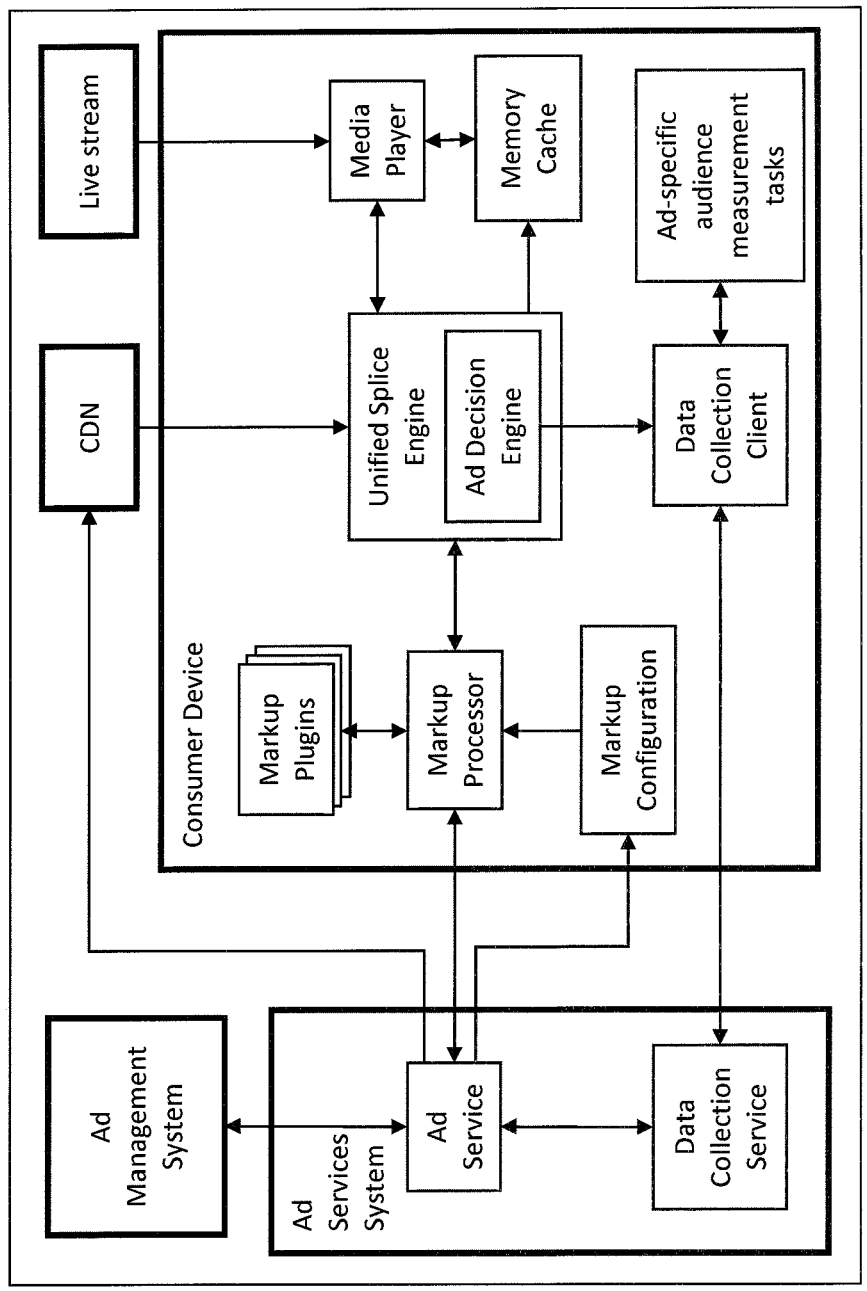
FIG. 7 is a diagram of Use-case 2 System Architecture: Live-TV ad insertion with IP delivered ad assets.

Reference is made now to a diagram of FIG. 7, which is a system architecture diagram showing Live-TV ad insertion with IP-delivered ad assets provided to address the above-discussed prior art drawbacks. The Ad Campaign Management System is provided with properly transformed audience measurement data to ensure sensitive data assets are controlled by the service provider from the entire Consumer Devices footprint on an ongoing basis. The existing data collection mechanism is reused to collect required data such as what program on what channel, when it is being watched, and on what consumer device.

Consumer devices are allowed to request ad videos ahead of time based on configurable period-of-time or based on a real-time event. In this respect, each consumer device can periodically (once in an hour, for example) request the list of the most anticipated ad videos from the Ad Provider for the next 24 hours or some other configurable frequency, as determined by the network conditions, available transports, and other applicable factors. Additionally, a consumer device may make a real-time request based on a configurable and dynamic real-time event such as a channel tune or a received ad trigger marker.

The Ad Service must monitor such requests, identify the same ad videos requested from different consumer devices, and initiate caching of the most requested ad videos. Furthermore, the Ad Service initiates caching of all ad assets on CDN for scheduled delivery to the Consumer Device. The response from the Ad Provider to the Consumer Device request for the list of ads must allow the Ad Service to identify the same ad assets scheduled for different consumer devices. The response from the Ad Provider must also contain targeting information (see below).

Provisioning for the low-latency ad delivery—caching and multicast transports are utilized by the Ad Service in the following manner: For the most popular ad assets associated with the maximum concurrency programming, the Ad Service initiates placement of the ad assets onto a multicast transport. The start of the multi-cast is initiated in real time upon the arrival of the ad trigger.

An example criteria for the provisioning of the ad asset is a combination of the following factors: the number of responses for the Consumer devices which schedule the referenced asset; the audience measurement popularity weight for the given programming; and time of the day matched to the programming targeting metadata. It should be noted that other criteria can be also considered if needed.

This method of caching ad videos using multicast delivery forms level 1 low-latency ad video cache for the most popular live streams where ad insertion is performed. The Ad Decision Engine is allowed to request ad videos from the Ad Service upon miscellaneous events including, but not limited to: (a) boundaries of the individual programs delivered in a live stream, (b) configurable time intervals, (c) watching a live stream for a configured minimum time, (d) programmatically utilizing the dynamic markup trigger event. The Ad Service consults the Ad Management System as necessary and commands Consumer Devices to cache the ad videos. The Ad Decision services verifies if the scheduled ad assets are available on the multicast level 1 cache and, if not, attempts to cache them locally in the RAM of the consumer device. This method of caching is considered level 2 cache. Due to the limited availability of the caching space in RAM, a Consumer Device only attempts to cache the ad videos scheduled for insertion into the most anticipated programming for this consumer device or the household it belongs to.

Example criteria for selecting an ad video for caching is a combination of the following factors: ad videos scheduled for insertion into the currently watched live stream; consumer device level or household level audience measurement data for the current device (history of content consumption) and time of the day. Other criteria can be also considered if needed, If an ad video that needs to be inserted is missing from both level 1 and level 2 caches, a unicast delivery of the ad video over available transport is attempted in real time. If network conditions do not allow for a successful ad impression, the system will register an ad opportunity miss, will not perform the ad video insertion, and will continue an uninterrupted showing of the original live stream video. The rest of the messaging flows and data processing is the same as Live TV with DVR-based caching use-case (please refer to the corresponding previous section).

Caching Flow for Devices with RAM Buffer Only

Figure 8:
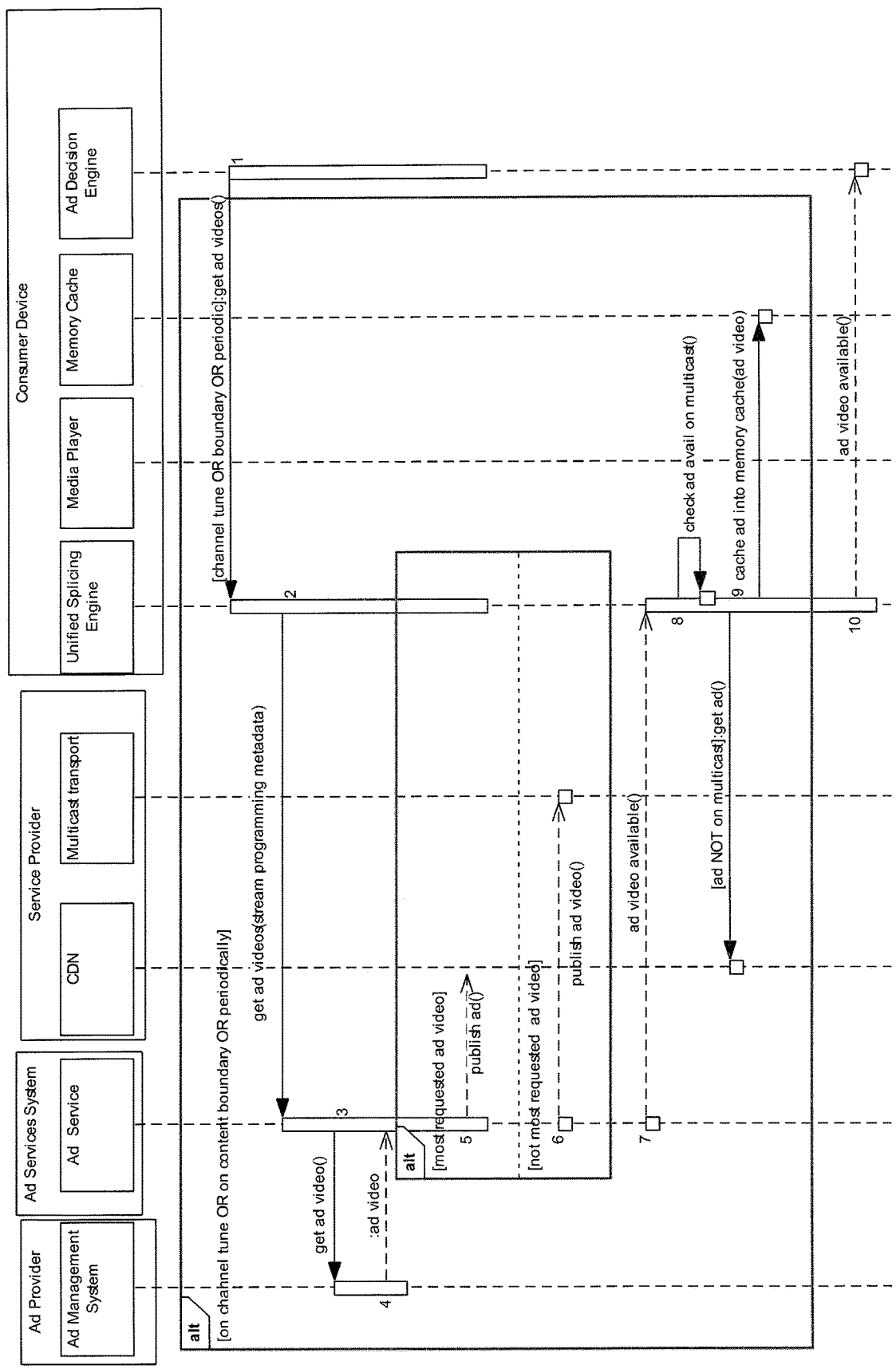
FIG. 8 is a diagram of Use-Case 2: Live-TV ad insertion with IP-delivered ad assets_(RAM (Random Access Memory) caching).

Reference is made now to the diagram of FIG. 8 which illustrates the RAM caching aspects of Use-Case 2. More specifically, FIG. 8 illustrates a process of priming the ad in the RAM cache for the consumer devices without local storage.

Regarding the caching flow for devices within the RAM buffer only, the most requested ad videos for the most popular live streams are made available by the system using multicast delivery. The Ad Services System may intelligently schedule the delivery of the ad content according to one or more configurable rules based on patterns of traffic and/or usage. A second method is for Consumer devices to issue periodic requests on miscellaneous events such as EPG data program boundaries, channel changes, watching a live stream for the configurable time intervals, etc. to cache the expected ad videos for the most anticipated live streams in the RAM buffer. Ads are only cached locally in the RAM, if they are not available on the multicast transport. If the required ad video is not present in the cache, the given ad video is requested in real time at the best effort service level. The request logic can be further optimized based on scheduling meta-data delivered to the consumer devices and processed by the present invention for optimal operation.

Impression Flow

Figure 9B:
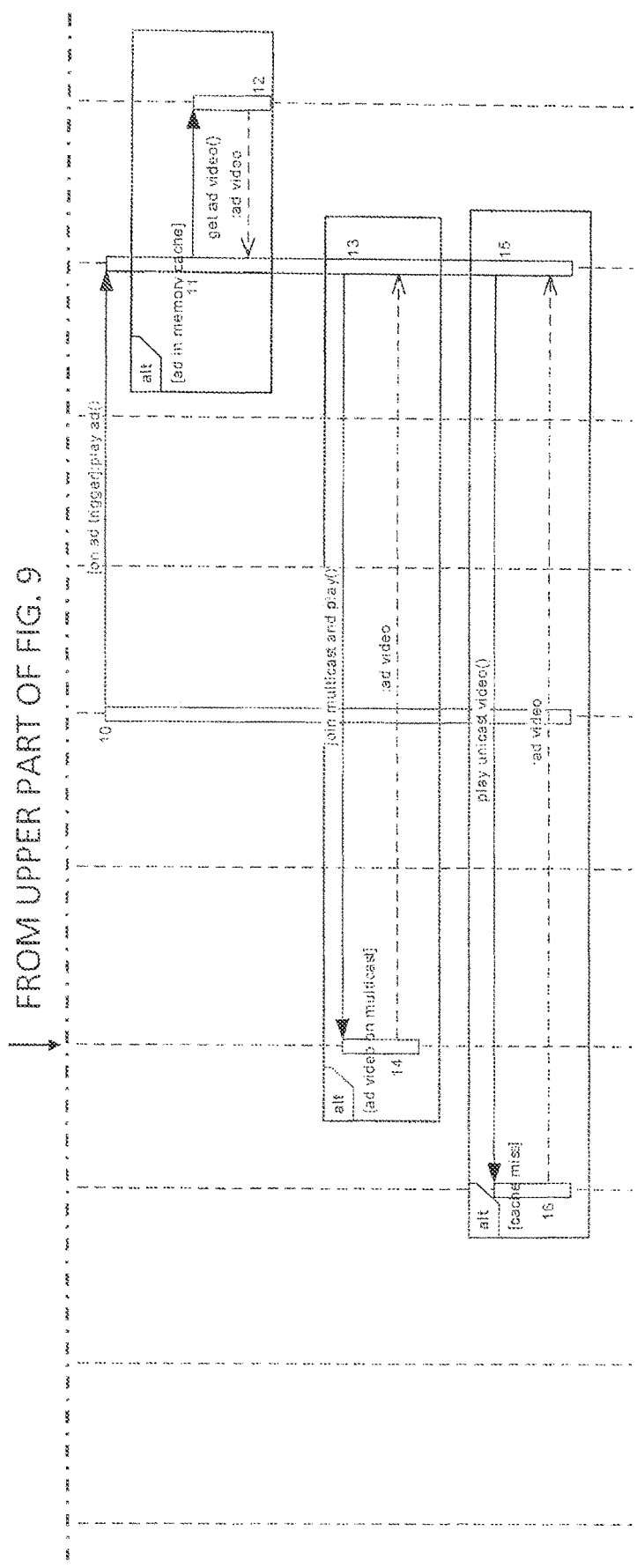
FIG. 9 is a diagram of Use-Case 2: Live-TV ad insertion with IP-delivered ad assets (impression flow).

Referring now to FIG. 9, which is a diagram illustrating the flow of events associated with delivering ad impression to the consumer device with no local storage. FIG. 9 also represents the flow initiated by the ad spot trigger. A similar flow occurs upon the scheduled boundary of the programs in the live stream.

The Unified Splicing Engine receives an original ad spot trigger from the live stream as it was inserted by the live stream origin. The Unified Splicing Engine uses a probability configuration as provided by the Ad Services System (see below) to decide whether the trigger will be relayed to the Ad Service. The probability configuration contains probabilities for a trigger to be relayed to Ad Services System. If the trigger is conditionally delivered to the Ad Services System, the Unified Splicing Engine commands, prior to delivery, the Markup Processor to enhance the trigger with data required for the Ad Management System to respond to the ad spot opportunity and for the Ad Services System to calculate the probabilities (see below) using the Markup Plugins. The Markup Processor relays the enhanced trigger to the Ad Services System.

Based on the audience measurement and information contained in the enhanced trigger, the Ad Services System constructs a probability configuration for the STBs to relay future ad spot triggers back to the Ad Services System. The more consumers are expected to watch a live stream, the less probability of relaying a trigger will be calculated by the Ad Services System for that channel. Only one trigger report per ad spot is processed by the Ad Services System and the rest are ignored; the probability configuration is required to minimize the number of the duplicate triggers relayed by STB population to the Ad Service. The Ad Services System sends one or more requests that correspond to a set of consumer devices' ad requests to the Ad Management System with ad spot information.

The Ad Management System replies with the following information: what ad videos are required to be delivered for a given ad spot on a given live stream; what ad videos the consumer devices are required to play; and what[are] the fallback ad videos are in case the required ad videos are missing from both level 1 and level 2 caches.

The Ad Services System responds to the Unified Splicing Engine by inserting ad-specific triggers into the live stream or through multicast/unicast delivery transports. Insertion of the ad-specific trigger can happen either as a reaction to the original trigger in the live stream, or it can be periodically based on scheduled time intervals. The Ad Services System initiates multicast ad video delivery and/or directed unicast delivery of an ad video based on targeting criteria and dynamic network utilization state.

The Unified Splicing Engine on the Consumer Device checks if the required ad video is available on the multicast transport or cached in memory. If the ad video is cached in memory (level 2 cache), then the Unified Splicing Engine commands a Media Player to play that ad video replacing the live stream. If the ad video is available on the multicast transport (level 1 cache), the Unified Splicing Engine commands the Media Player to play that ad video replacing the live stream. If the ad video is missing from both level 1 and level 2 caches, then an attempt to retrieve the ad video over a unicast delivery is performed. The reporting flow in this application is the same as in the use case of Live Video with the local DVR cache use case. Thus, the description of flow reporting is not provided.

Use-Case 3: Ad Insertion into DVR and Live-to-VOD Playout

This section discloses an example use-case application of the present invention for inserting ad videos into a recorded Live TV programming which are stored in the service provider provided systems such as Cloud DVR (same as Network DVR) or Live-to-VOD (also known as Catch Up TV). Only the Live-to-VOD aspect of the Video-On-Demand (VOD) video delivery is covered in this section. Both Cloud DVR and Live-to-VOD playouts are nearly identical from the perspective of the present invention.

Pre-caching the matching ad videos for each recorded program is not feasible due to the high storage overhead requirements. Due to this fact, the ad video delivery method is unicast. Pre-roll ad insertion presents the biggest challenge because there is a limited lead time available to pre-buffer the ad content delivered via unicast. Insertion of ad videos into playout of the VOD and Cloud DVR content has been traditionally performed as network-based ad insertion through SCTE-130-based advertisement campaign management systems tightly coupled with the corresponding VOD or Cloud DVR back-office through a vendor-specific Ad Decision Management (ADM) component. ADM components are tightly coupled with the specific back-office. In view of the above, a universal solution is challenging.

Ad spot triggers in the recorded live programming may be located too close to the actual ad spot, which will not allow for a real time ad request and response during the playout of the recorded program. The VOD client and Cloud DVR client on a consumer device may not allow access to the SCTE-35 triggers in MPEG stream during or after the recording process. The issue of the poor timing of the ad spot trigger for the recorded live programming cannot be addressed on the consumer device side, as recorded programming is not directly accessible by the consumer device (access is only possible through cloud DVR and VOD client and via cloud DVR and VOD back-office).

Figure 10:
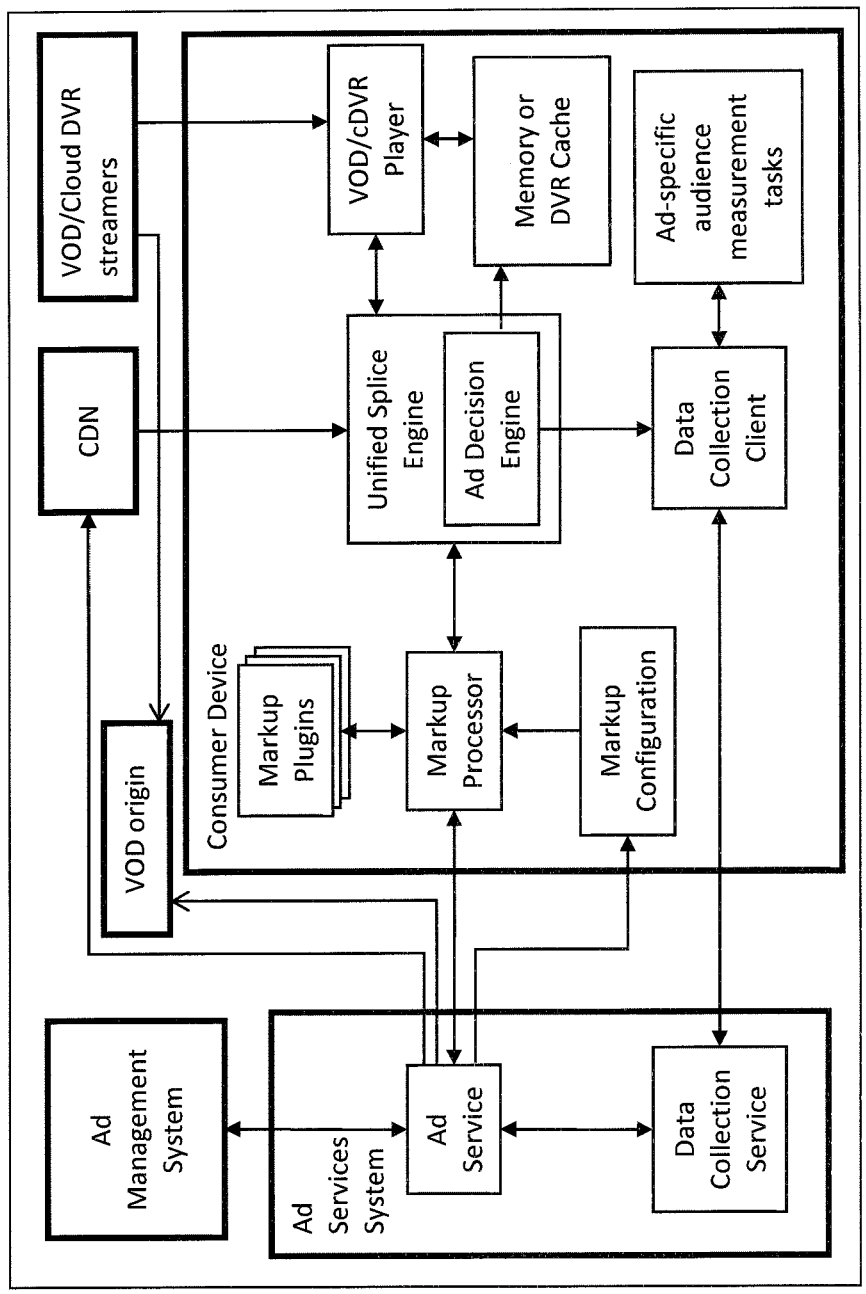
FIG. 10 is a diagram of Use-Case 3 System Architecture: ad insertion into DVR and Live-to-VOD playout.

Reference is made now to the diagram of FIG. 10, which is the system architecture diagram of Use-Case 3 disclosing the ad insertion into DVR and Live-to-VOD playout, and also illustrating structural components which provide the ad splicing for the Live-To-VOD or Cloud DVR sessions. Cloud DVR, from the perspective of the ad video insertion, is a subset of the overall VOD scenario. The full VOD use case, however, is wider and constitutes recordings of the programming that previously aired on Live TV as well as premium featured content (movies). Handling of the ad spot information and the insertion of the ad videos into the premium VOD playout are covered in other sections of the document.

The following section provides a high level overview of the solution. A detailed explanation of each flow is provided below. Cloud DVR platforms in North America mandate creation of the unique copy of the programming per consumer account, therefore offline collection (after recording of the program completes) of ad spot triggers may be very probable. If this is the case, then offline collection is only used for the Live-to-VOD use case.

This embodiment of the invention provides the following methods of ad spots set creation: (1) The system provides an offline ad spot scanner utility which integrates into a normal VOD ingest workflow, and Cloud DVR ingest workflow. The collected ad spot set information is ingested into the Ad Service. Offline ingestion of the ad spot information allows for pre-caching of the ad assets. (2) For the Cloud DVR use-case, if the offline collection of ad spot triggers is not available, such triggers will be processed in real time. (3) For the recorded programs that do not have ad spot triggers, a method of automatic rule-based generation of ad spots is provided.

If local storage is available on the Consumer Device and the offline ad spot trigger information is collected, ad video pre-caching will be performed the same way as described in the Local DVR playout use-case. It should be noted that the VOD/Cloud DVR Player (Video-On-Demand Player, Cloud DVR Player) is to be used in place of a more generic Media Player.

Offline Acquisition of the SCTE-35 Ad Spot Triggers

Figure 11:
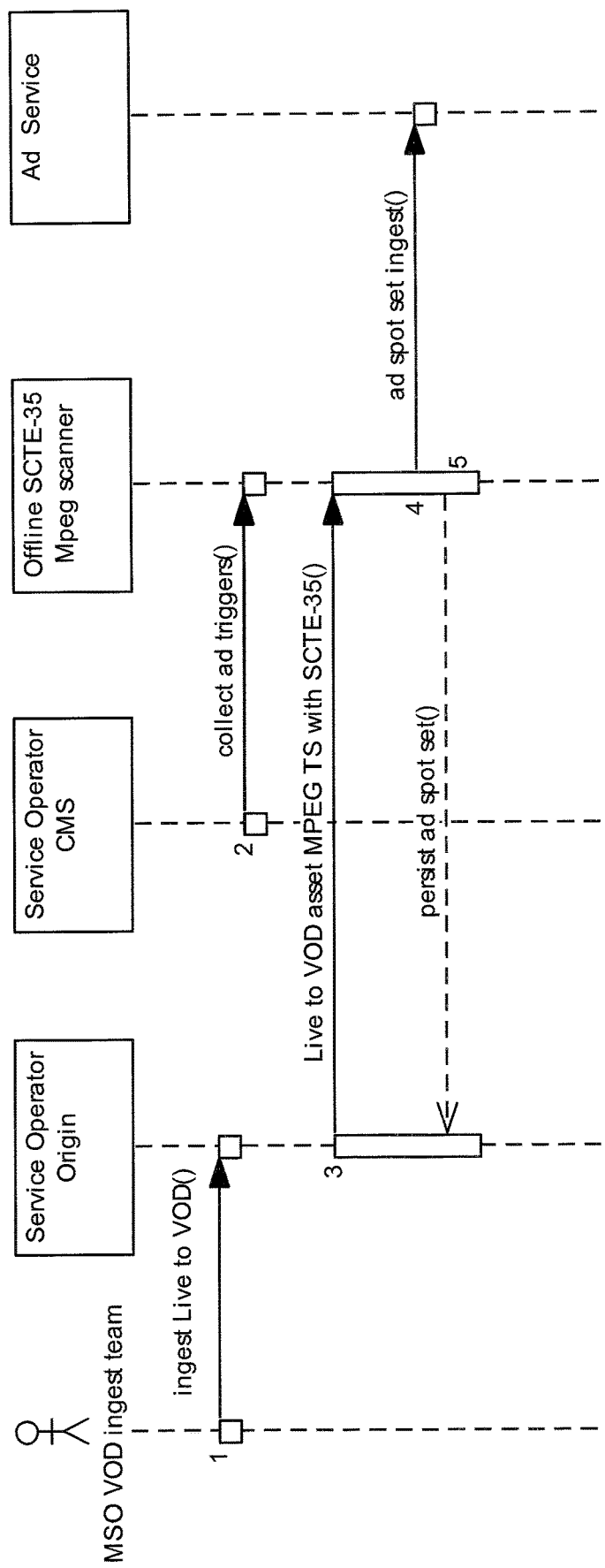
FIG. 11 is a diagram of Use-Case 3: ad insertion into DVR and Live-to-VOD playout.

Reference is made now to FIG. 11, illustrating the sequence of events representing the offline SCTE-35 trigger collection. For the Live-to-VOD and shared copy Cloud DVR scenario, the offline collection of the ad spot set is performed as described below. As an example of the ad spot trigger, the SCTE-35 trigger is used. For the unique copy Cloud DVR scenario, such collection will create high overload, therefore pre-caching the ad assets will not be performed, and ads will be accessed in real time on an incoming ad spot trigger during playout.

Caching Flow for when Offline Ad Spot Information is Available

Figure 12:
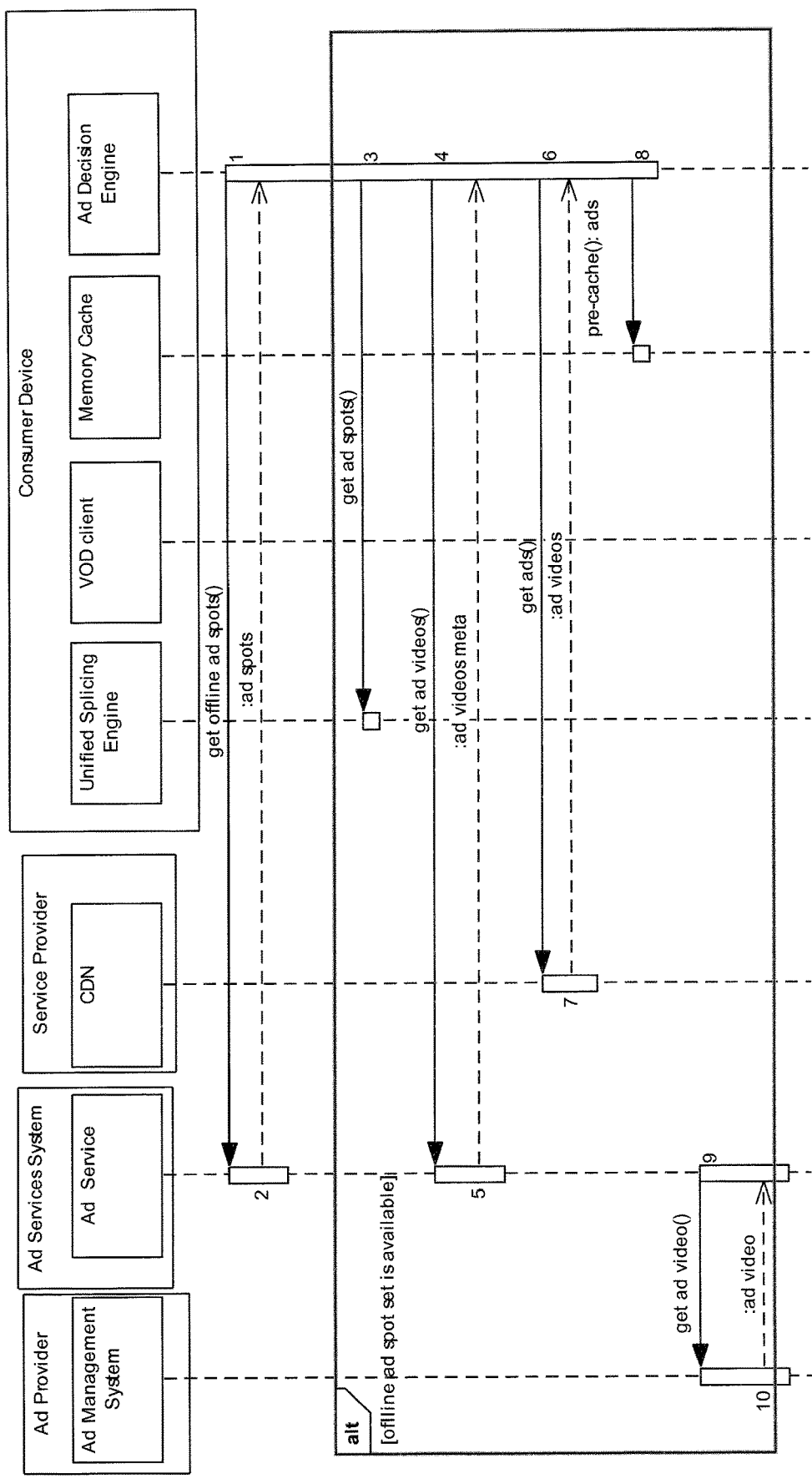
FIG. 12 is a diagram of Use-Case 3: ad insertion into DVR and Live-to-VOD playout (pre-caching and buffering).

Reference is made now to the diagram of FIG. 12, which illustrates the pre-caching and buffering method for the Live-to-VOD and Cloud DVR ad insertion use case. Pre-caching of the most anticipated ad videos on the local CDN is described in the ads for Live TV with a DVR-based Caching use-case and is not repeated here. The caching flow is only applicable when offline ad spot information is collected. The caching mechanism is similar to the caching implementation for Consumer Devices with local storage. If the ad video is not cached, such an ad video is requested in real time at the time of the ad spot trigger arrival at best effort service level.

Impression flow in this application is similar to that of the Local DVR Playout use case and the description is not repeated here. For the description of the respective impression flow, refer to the corresponding section of the application. The reporting flow is similar to that of Live Video with local DVR cache use case and the description is not repeated here. For the description of the respective reporting flow, refer to the corresponding section of the application.

Use-Case 4: Ad Insertion into Playout of Locally Stored DVR Recordings

This section discloses an example use-case application of the present invention for inserting ad videos during the playout of the recorded programs that are stored in the DVR storage of the consumer device. The model of operation is unicast and is statistically randomized. Pre-caching the matching ad assets for each record created on the local hard drive is not feasible due to the high storage overhead requirements. Pre-roll ad insertion presents the biggest challenge because there is a limited lead time available to pre-buffer ad content delivered via unicast from the CDN. Ad triggers in the recorder programming may be located too close to the actual ad spot, which will not allow for a real time ad request and response during playout of the recorded program. A DVR client on a consumer device may not allow access to the SCTE-35 triggers in MPEG stream during or after the recording process.

Figure 13:
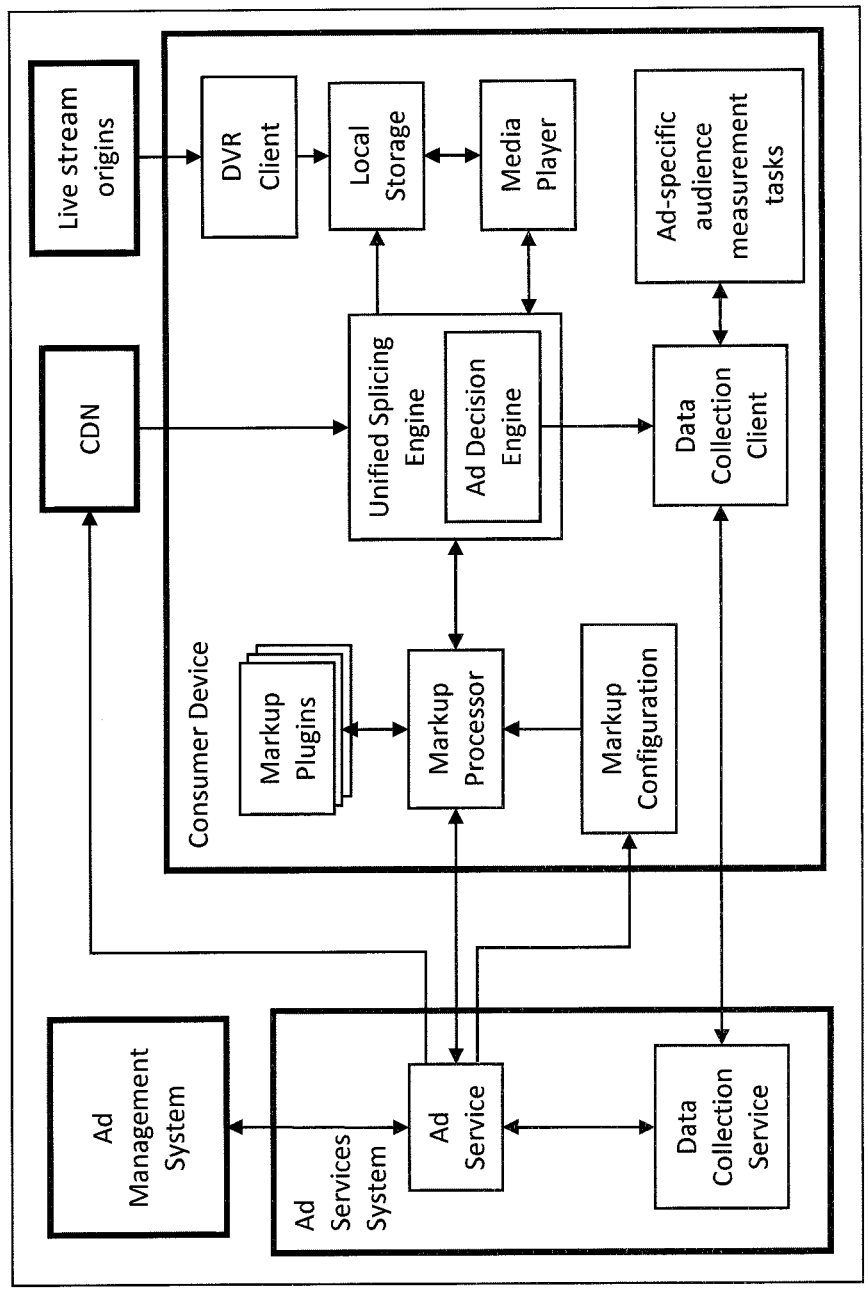
FIG. 13 is a diagram of Use-Case 4: ad insertion into playout of locally stored DVR recordings.

Reference is made now to the architecture diagram of FIG. 13, which illustrates flows of an embodiment of the invention provided to resolve the above-noted drawbacks of the prior art. To address the issue of the poor timing of the ad triggers (poor timing), acquisition of the ad spot trigger while recording is recommended. During recording, a set of SCTE-35 ad spot triggers arriving in the MPEG stream should be captured and left on the DVR local storage alongside with a recorded program. Availability of extracted ad spot triggers also allows for pre-caching of ads during recording playout.

This embodiment of the invention provides the following methods of ad spots set creation: (1) For the DVR-enabled consumer devices where the DVR client allows access to SCTE-35 triggers, said triggers will be captured during the recording process. (2) For the DVR-enabled consumer devices where the DVR client does not provide access to SCTE-35 triggers, a scan of the recorded programs for detection of the triggers is provided. (3) For the recorded programs that do not have SCTE-35 triggers, a method of automatic rule-based generation of ad spots is provided.

Captured triggers are persisted on the local DVR storage to form the set of ad spots matching each recording. A set of ad spots is enriched with the targeting information related to the programming metadata and customer profile.

For a faster pre-roll playout, the Ad Decision Engine may attempt to pre-cache the ad videos in the following priority: Availability of the next episode of the existing series recordings; New recording availability; Recording viewership stats.

Ad targeting for pre-caching is based on the user profile and programming metadata. The Universal Splicing Engine (USE) component (see below) implements the cache selection and cache routing to facilitate a faster pre-roll playout of the ad videos. On the playout of the locally stored recorded program, the Ad Decision Engine looks up a set of ad spots asked for by the DVR client during recording and an issue corresponding ad request to the Ad Management System. The pre-roll ad is played from the cache or fetched directly from the CDN. Mid- and post-rolls ad videos for the existing ad spots set are retrieved from CDN via unicast transport and cached on the local storage during the recording playout and ahead of the actual ad spot. The rest of the messaging flows and data processing is the same as for Live TV with a DVR-based Caching use case (please refer to the corresponding section).

Flow: Acquisition of the Ad Spots

Figure 14:
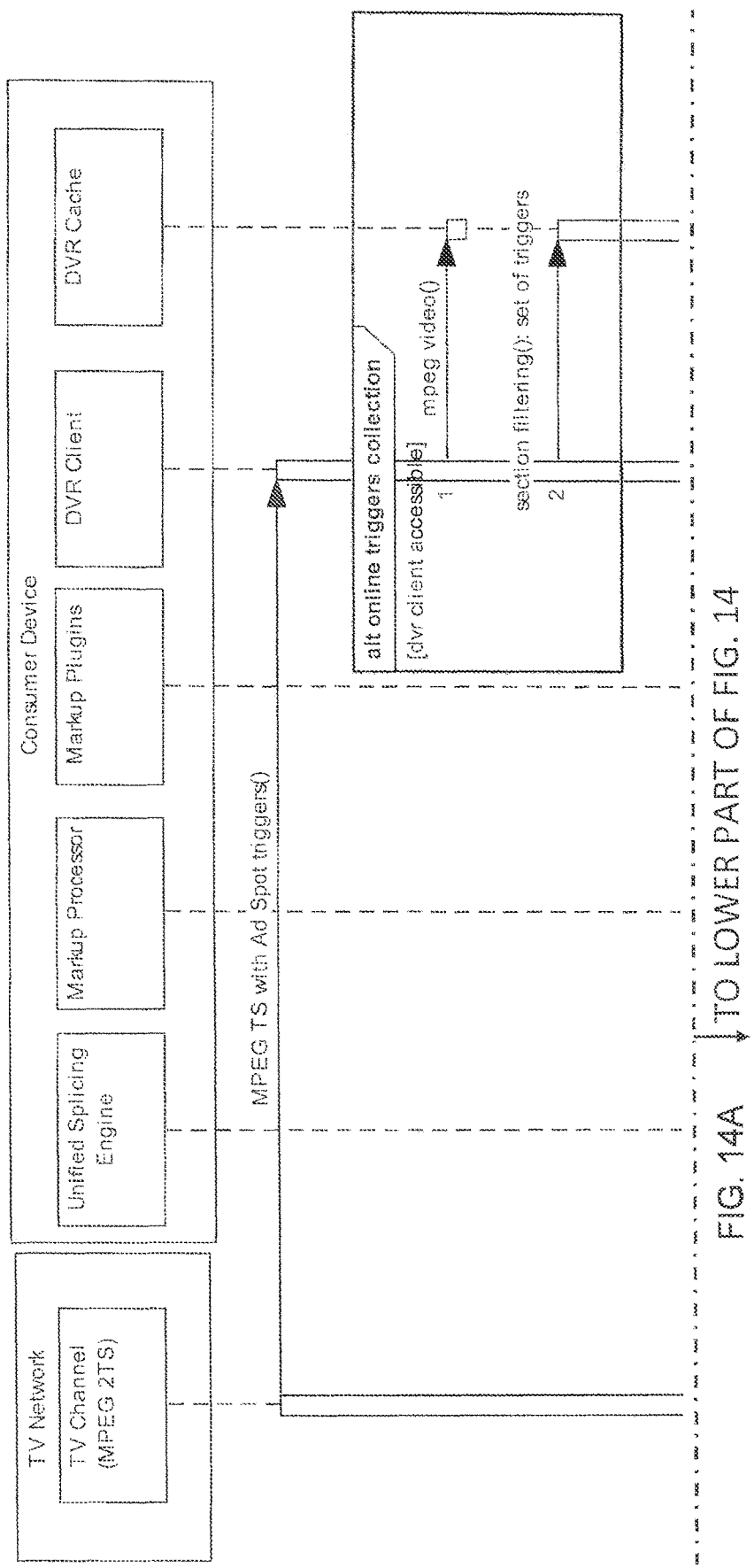
FIG. 14 is a diagram of Use-Case 4: ad insertion into playout of locally stored DVR recordings (acquisition of the ad spots).
Figure 14B:
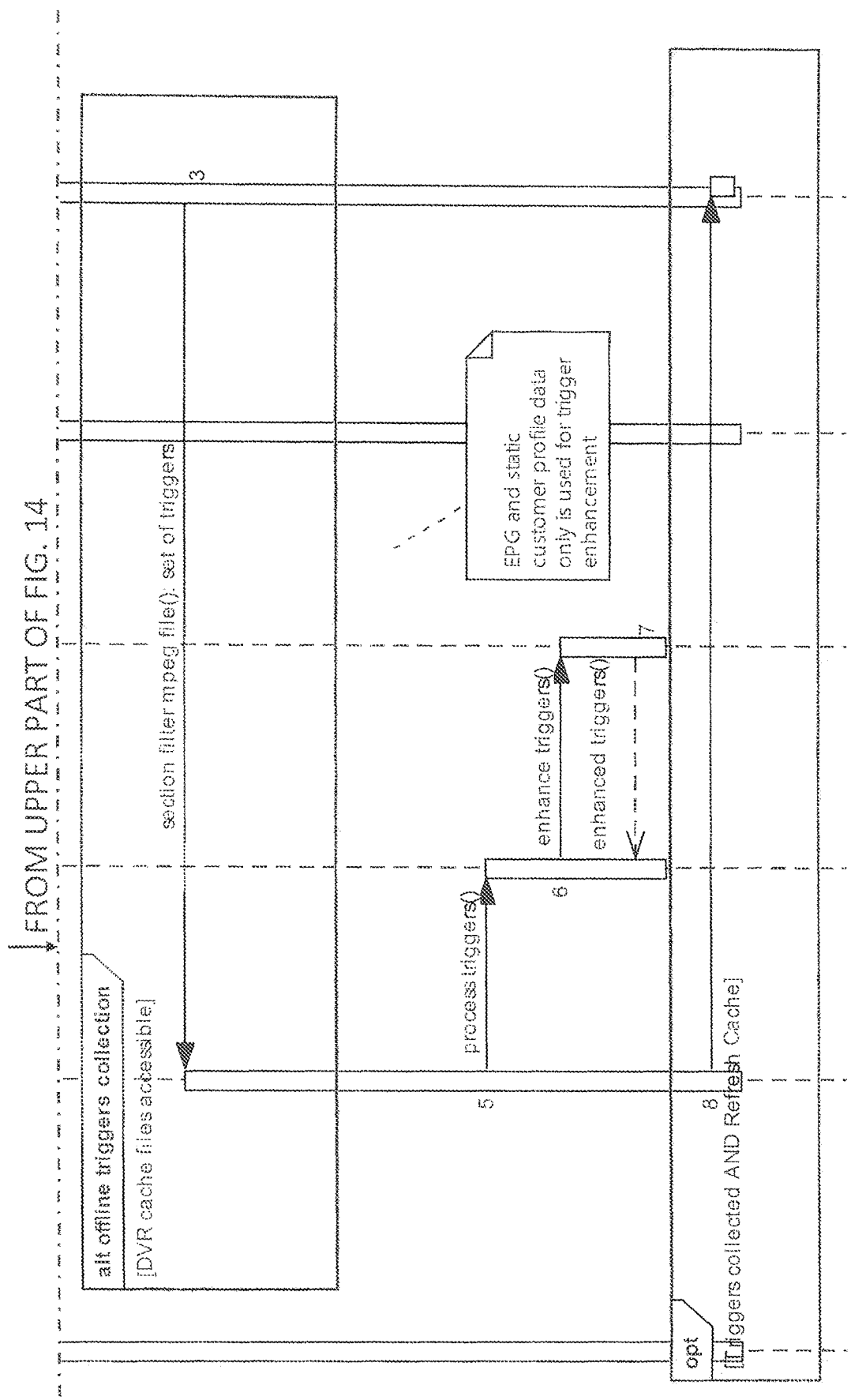

Reference is made now to FIG. 14, which is a diagram of Use-Case 4 illustrating acquisition of the ad spots aspect of ad insertion into a playout of locally stored DVR recordings. FIG. 14 also illustrates the process of trigger acquisition discussed below. Live stream origins, such as TV Networks, provide video feed with embedded SCTE-35 ad spot triggers which is being recorded by the DVR client and persisted on the DVR cache. If accessible, the DVR client analyzes incoming video feed and retrieves the SCTE-35 ad spot triggers from the data PID of the MPEG transport stream. If the DVR client does not retrieve SCTE-35 triggers, the DVR recordings are accessed as files post-recording by USE to perform a scan on the newly completed recording for ad spot triggers. If a set of triggers is collected, it is being processed and decorated by the Markup Processor and Markup plugins. Static information such as EPG metadata and customer profile data can be used for decoration. If triggers are not present in the recorded program or cannot be retrieved, then triggers are artificially generated based on the ad spot generation rules provided by the Ad Service.

Flow: Local DVR Pre-Caching

Figure 15B:
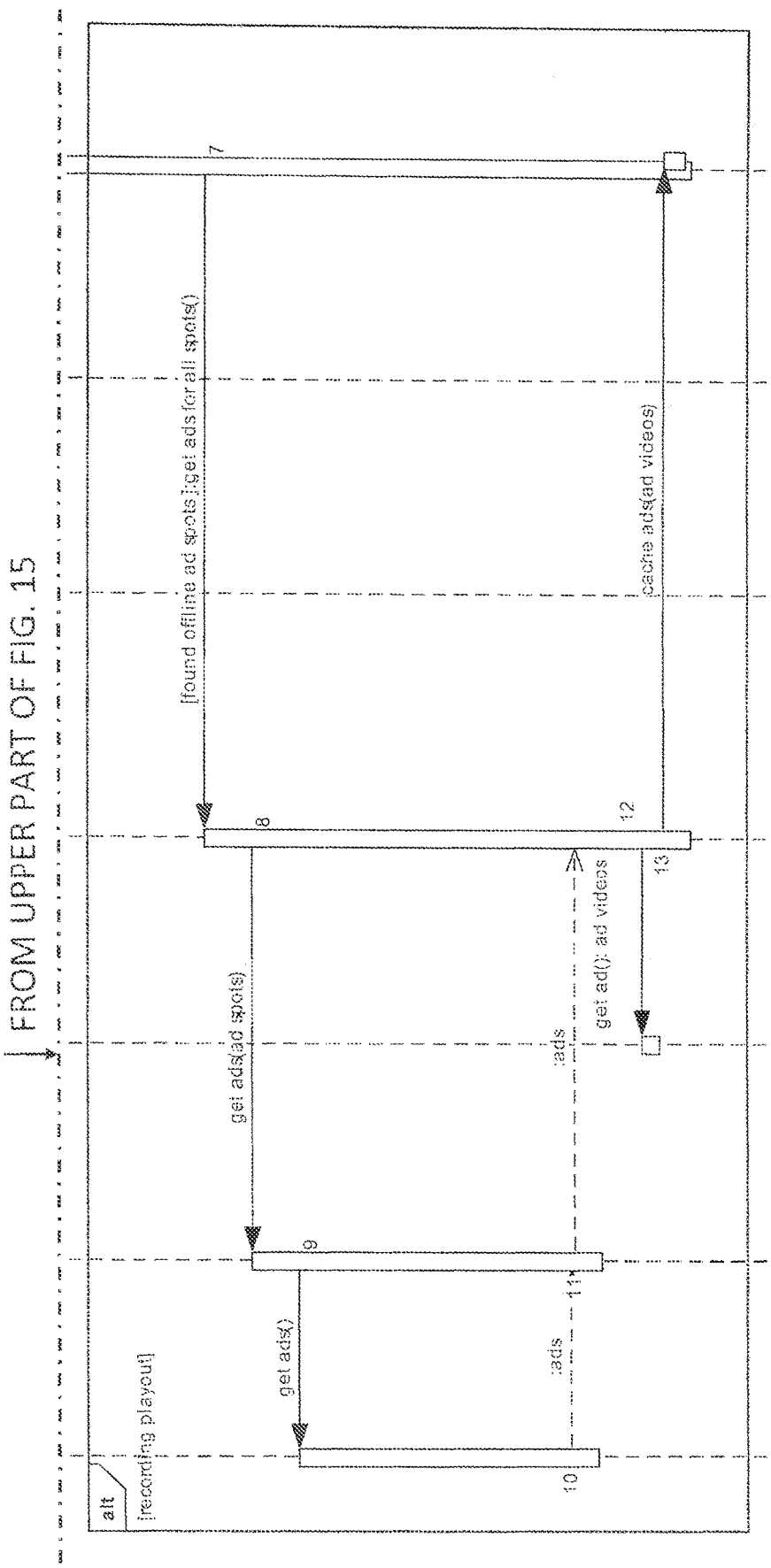
FIG. 15 is a diagram of Use-Case 4: ad insertion into playout of locally stored DVR recordings (local caching and multicast transport).

Reference is made now to the diagram of FIG. 15 which illustrates the local caching and multicast transport aspects of Use-Case 4. More specifically, FIG. 15 illustrates selection of the transport and pre-caching event sequence. Pre-caching of the most anticipated ad videos on the local CDN is described in the Ads for Live TV with DVR-based Caching use-case and is not repeated here.

The Ad Decision Engine running on the set-top box in conjunction with the Ad Services System may periodically request an ad for pre-roll caching to speed up recording playout from the Ad Management System. The mid- and post-roll ad is pre-cached on a recording play-back. The ad videos for pre-roll are pre-cached using the following criteria in order of priority: (1) Availability of the next episode of the existing series recordings; (2) New recording availability; (3) Recording viewership stats; and (4) Date change. If pre-acquisition of the ad spot list is not possible, all ads will be requested during recording playout.

Flow: Ad Impression

Figure 16:
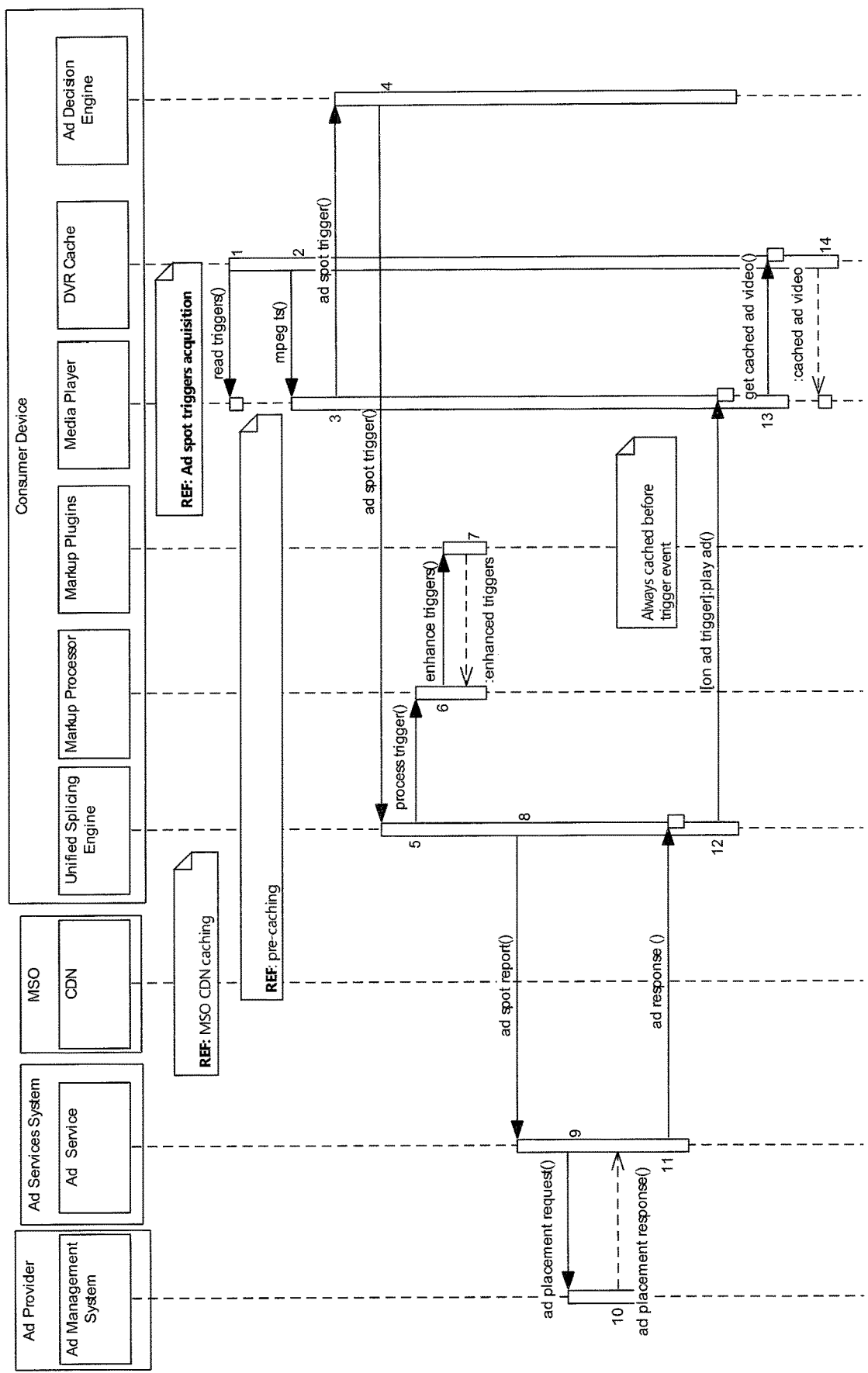
FIG. 16 is a diagram of Use-Case 4: ad insertion into playout of locally stored DVR recordings (flow initiated by ad spot trigger).

Reference is made now to the diagram of FIG. 16, which illustrates flow initiated by the ad spot trigger aspect of Use-Case 4. More specifically, FIG. 16 illustrates Ad Impression flow. The Media Player communicates playout start to the Unified Splicing Engine. The Unified Splicing Engine retrieves an ad trigger associated with a recorded program that is being played. The Unified Splicing Engine commands the Markup Processor to enhance the trigger with data required for the Ad Management System to respond to the ad spot opportunity. The Markup Processor relays the enhanced trigger to the Ad Services System. The request is sent to the Ad Services System for a real time ad decision.

Based on the audience measurement and information contained in the enhanced trigger, the Ad Services System constructs a request to the Ad Management System and sends it out. The Ad Management System replies with the following information: What ad videos the consumer device is required to play from the previously filled MSO CDN cache or local cache in the consumer device's local storage; and what are the fallback ad videos are in case the required ad videos are not cached.

The Ad Services System relays the response to the Unified Splicing Engine. Upon starting recording playout, the Unified Splicing Engine on the consumer device caches ad videos on the local storage. If the video is cached, then the Unified Splicing Engine commands a Media Player to play that ad video by splicing it into the recorded program being played. If the video is not cached or the consumer device failed to acquire a unicast stream from the CDN, the Unified Splicing Engine commands the Media Player to playa preferred default ad video available in the local DVR cache (local storage). Flow Impression Reporting is the same as in the use case of Live Video with a local DVR cache use case and a separate description is not provided.

Use-Case 5: Ad Insertion into Playout of Premium VOD Content

This section discloses an example use-case application of the present invention for inserting ad videos into featured VOD content which does not carry an embedded ad spot markup. Such a scenario is usually applicable for the premium VOD content (featured movies) which is ingested by a service provider directly from the VOD content providers and is not recorded from live broadcast streams. Typically, such content does not carry an ad spot triggers markup. Content providers, when interested in dynamic ad insertion, provide breakpoint information during the VOD ingest process. Information is ingested into the Ad Service and the Ad Decision Management System via out of band ingest.

In the prior art pre-roll, ad video insertion presents a substantial challenge. This is because there is a limited lead time available to pre-buffer ad content delivered via unicast. Ad insertion into the VOD and Cloud DVR content playout has been traditionally performed as network-based ad insertion through SCTE-130 based campaign management systems tightly coupled with the corresponding VOD or Cloud DVR back-office through a vendor specific ADM component. The scope of this document is limited to client-based ad video insertion.

Figure 17:
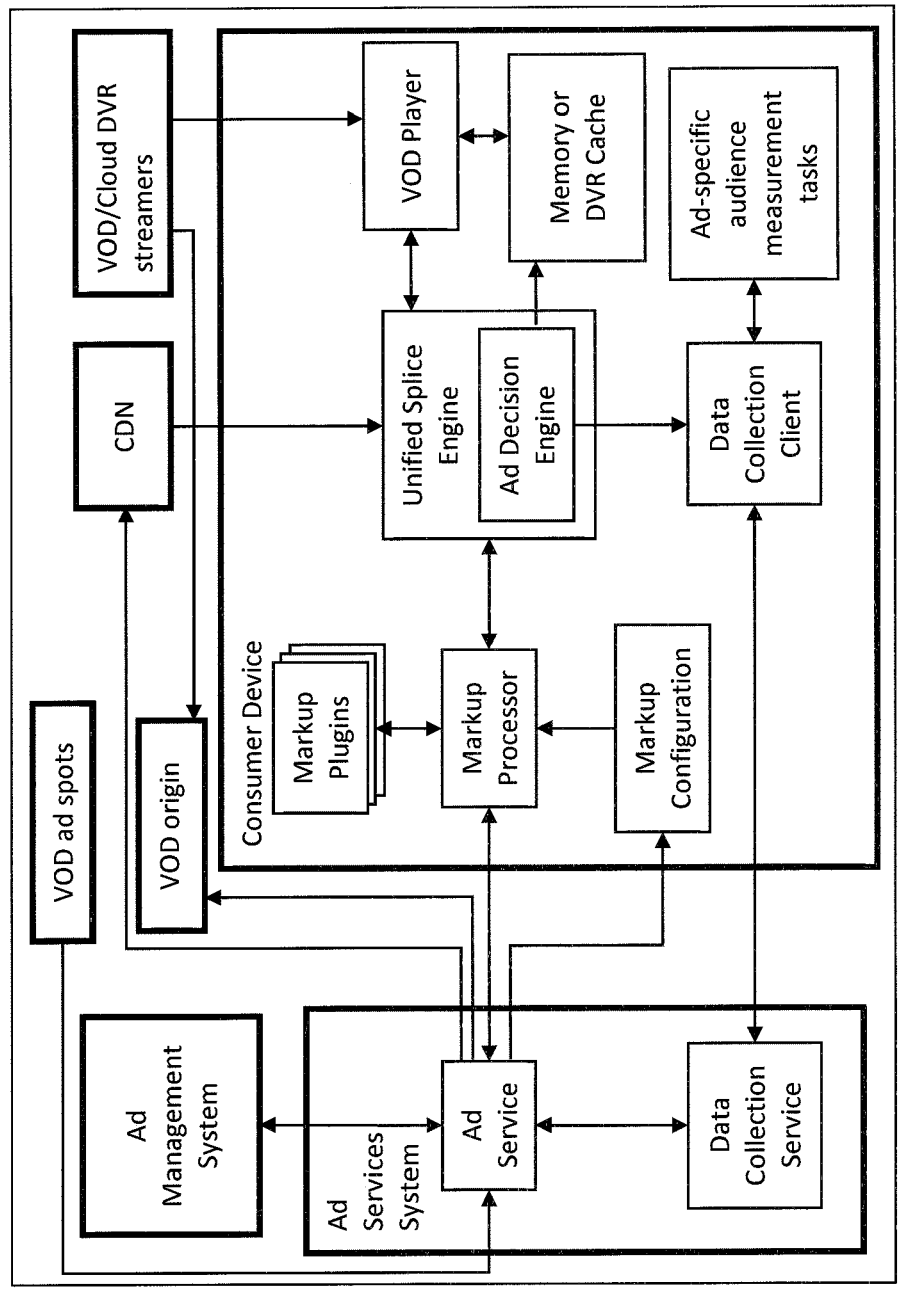
FIG. 17 is a diagram of Use-Case 5: ad insertion into playout of premium VOD content.

Reference is made now to FIG. 17, which is a diagram of Use-Case 5: Ad insertion into playout of premium VOD content. The architecture diagram of FIG. 17 illustrates structural components supporting the solution of the above noted prior art drawbacks by the invention. A detailed explanation of each flow is provided below.

This aspect of the invention provides the following methods of ad spots set creation: Out of band ingestion of the ad spot information (also known as break point information) into the Ad Service and Ad Management System; and for the recorded programs that do not have out of band ad spot information, a method of automatic rule[s]-based generation of ad spots is provided. It should be noted that the VOD Player is used in place of a generic Media Player to specifically reference the VOD use.

Offline Acquisition of the Out of Band Ad Spot Triggers

Figure 18:
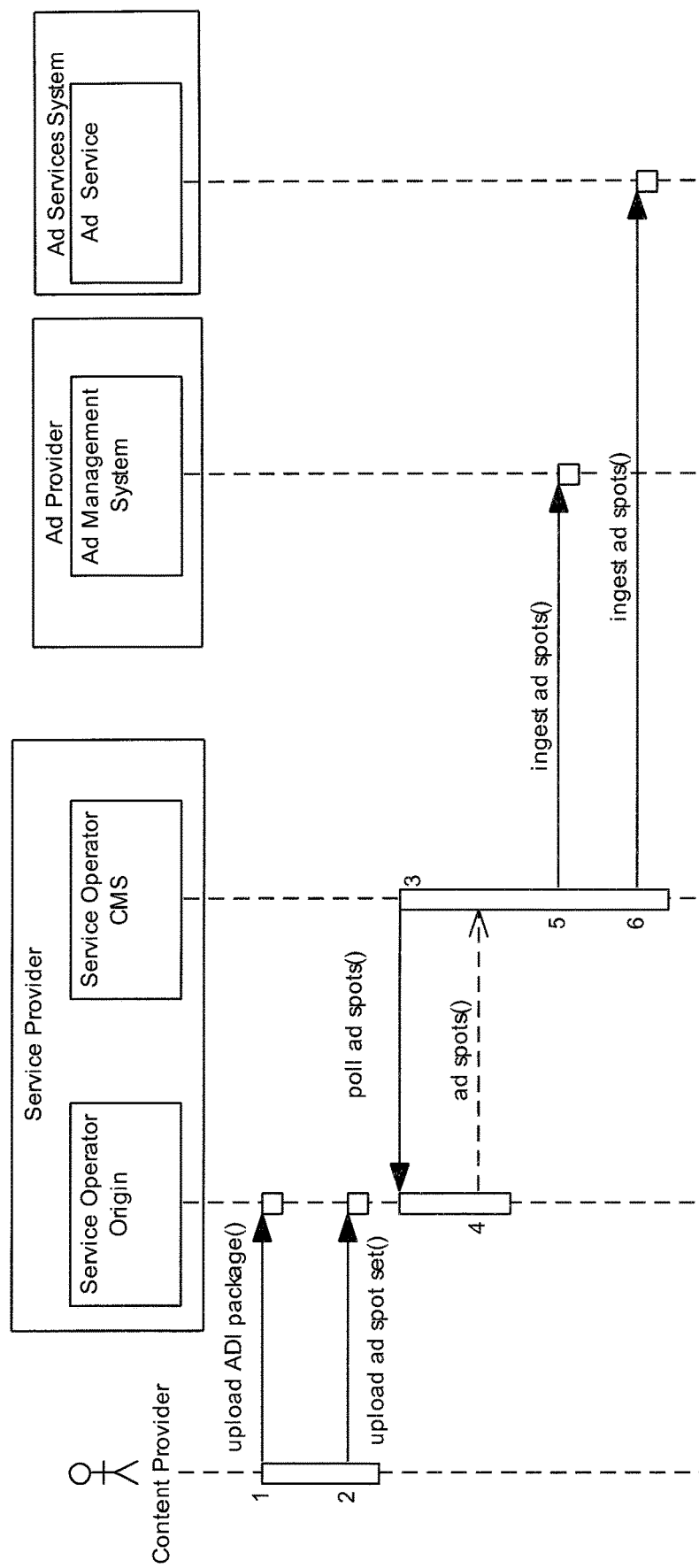
FIG. 18 is a diagram of Use-Case 5: ad insertion into playout of premium VOD content (offline ad spot ingest).

Reference is made now to the diagram of FIG. 18 which illustrates the offline ad spot ingest process aspect of Use-Case 5. For the Live-to-VOD and Cloud DVR with shared copies of the recorded programs, offline collection of the ad spot set is performed as described below. For the unique copy Cloud DVR scenario, such collection creates high overhead, therefore pre-caching of ad assets is not performed, and ad videos are accessed in real time on an incoming ad spot trigger.

Caching Flow for when Offline Ad Spot Information is Available

Caching flow of the ad videos is identical to that of the Cloud DVR and Live to VOD use case and is not described here. It is essential that for the Ad Service plugin implementing VAST protocol, ad assets are directly available either as embedded into the VAST response or as redirect instruction for retrieval from the CDN.

The Ad Service performs the necessary URL translation when the Service Provider's CDN is used for caching ad videos. In case of the SCTE-130 signaling plug-in, the Ad Service relies on the SCTE-130 extensibility interfaces to provide the ad videos URL information for caching and real time retrieval.

Impression Flow

Figure 19B:
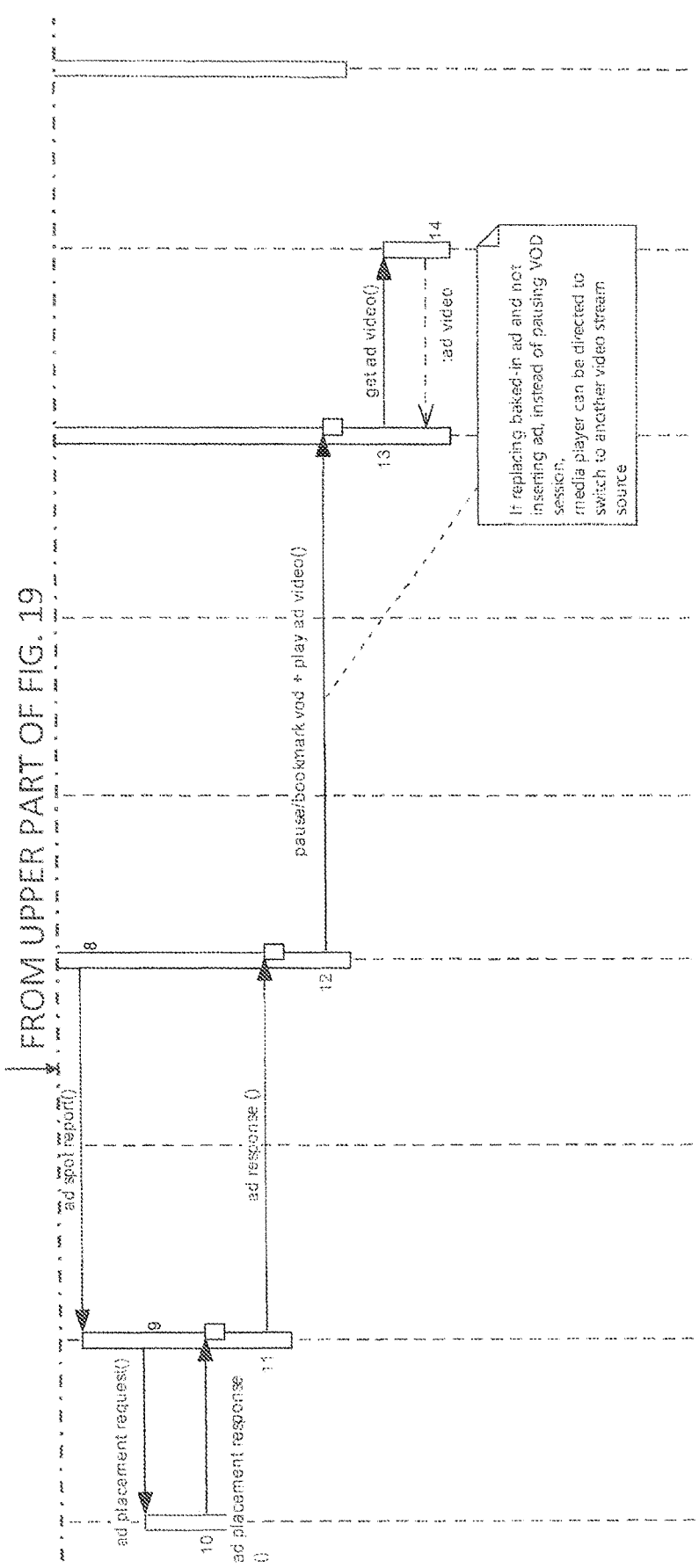
FIG. 19 is a diagram of Use-Case 5: ad insertion into playout of premium VOD content (VOD playout impression).

Reference is made now to FIG. 19 which illustrates the VOD playout impression aspect of Use-Case 5. More specifically, FIG. 19 represents the sequence of events associated with reporting ad impression associated with the Premium VOD dynamic ad insertion. The VOD Player communicates the playout start to the Unified Splicing Engine. The Unified Splicing Engine retrieves a set of ad triggers associated with a recorded program being played from the Ad Service. The Ad triggers have been ingested into the Ad Service as part of a premium VOD content ingest process. The Unified Splicing Engine commands the Markup Processor to enhance the trigger with data required for the Ad Management System to respond to the ad spot opportunity.

The Markup Processor relays the enhanced trigger to the Ad Services System. The request is sent to the Ad Services System for a real time ad decision. Based on the audience measurement and information contained in the enhanced trigger, the Ad Services System constructs a request to the Ad Management System and sends it out.

The Ad Management System replies with the following information: What ad videos the consumer device is required to play from the previously filled Content Provider's CDN cache or local cache in the consumer device's local storage; and what the fallback ad videos are in case the required ad videos are not cached.

The Ad Services System relays the response to the Unified Splicing Engine. Upon starting the recording playout, the Unified Splicing Engine on the consumer device caches ad videos in its memory cache. Upon reaching the ad spot, if the video is cached, then the Unified Splicing Engine commands the VOD Player to pause VOD session and play that ad video by splicing it into the VOD program being played. If the ad video is replacing a baked-in ad, then the original VOD session stream is not paused but is disconnected from the video presentation. The spliced ad is connected instead. If the video is not cached or consumer device failed to acquire a unicast stream from the CDN, the Unified Splicing Engine commands the VOD Player to play a preferred default ad video available in the local DVR cache (local storage).

Reporting flow in this process is the same as in the use case of Live Video with a local DVR cache. Therefore, a separate description of this flow reporting is not provided.

Use-Case 6: Live-TV Ad Insertion with QAM Delivered Ad Assets

This section discloses an example use-case application of the present invention for inserting ad videos into live TV streams watched simultaneously by large population of consumer devices with limited broadband IP connectivity and without a local storage capable of caching a meaningful number of ad videos. It is applicable to consumer devices with limited performance and network capabilities, or cases where the operator network is also limited by IP network bandwidth.

Hundreds of thousands and even millions of consumers are watching TV at the same time during peak hour or highly popular shows such as sports, etc. Consumer devices with limited broadband IP connectivity cannot retrieve the ad videos in real time using an IP unicast channel due to device or network limitation. Consumer devices without a meaningful amount of local storage have no capacity for pre-caching a necessary variety of ad assets locally. Ad placement opportunities in live recordings are announced only few seconds before an ad spot on each channel (SCTE-35 trigger in MPEG-TS). Ad triggers may also be unreliable. The current infrastructure has challenges in supporting many individual targeted ad videos at the same time. All viewers on the same channel will have an ad spot at the same time. Ad blocks on different channels may be scheduled for the same moment in time. All viewers across all such channels have an ad spot displayed at the same time (and receive triggers at their Consumer Devices a few seconds ahead of an ad spot).

Figure 20:
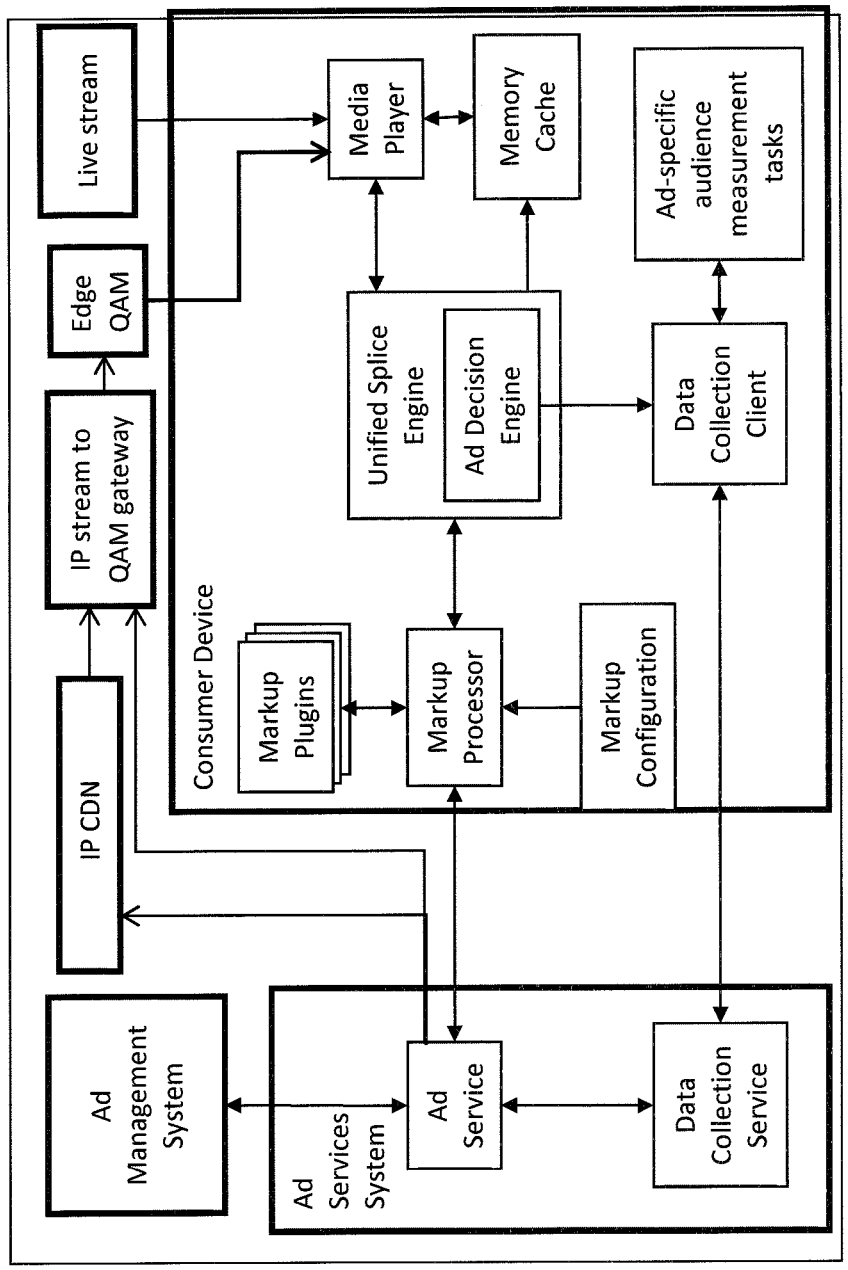
FIG. 20 is a diagram of Use-case 6 System Architecture: Live-TV ad insertion with QAM delivered ad assets.

Reference is made now to FIG. 20, which is a diagram of the Use-case 6 System Architecture, providing solution to the above noted prior art drawbacks. The Ad Campaign Management System is provided with properly transformed audience measurement data to ensure that sensitive data assets are controlled by the service provider from the entire Consumer Devices footprint on an ongoing basis. The existing data collection mechanism is reused to collect required data, such as what program on what channel, when it is being watched, and on what consumer device.

Consumer devices are allowed to request ad videos ahead of time based on a configurable period-of-time or based on a real-time event. Alternatively, meta-data describing the ad video schedule may be delivered to the consumer device under the control of the Ad Services system. Each consumer device can periodically (once in an hour, for example) request the list of the most anticipated ad videos from the Ad Provider for the next 24 hours or some other configurable frequency as determined by the network conditions, available transports, and other applicable factors. Additionally, a consumer device may make a real-time request based on a configurable real-time event such as a channel tune or a received ad trigger marker. Alternatively, the Ad Services System may deliver meta-data describing anticipated ad videos.

The Ad Service must monitor the above-noted requests, identify the same ad videos requested from different consumer devices, and initiate caching of the most requested ad videos. The Ad Service initiates caching of all ad assets on the CDN for scheduled delivery to the Consumer Device. The response from the Ad Provider to the Consumer Device's request for the list of ads must allow the Ad Service to identify the same ad assets scheduled for different consumer devices. The response from the Ad Provider must also contain targeting information (see below). Specifically, for delivery to consumer devices which do not have broadband IP connectivity or limited broadband IP connectivity, and are therefore capable of video delivery using QAM transport only, the Ad Decision Engine will utilize the IP stream to a QAM gateway to start multiplexing of the ad video into MPEG TS. MPEG TS will feed edge QAM for retrieval by the consumer devices which have no broadband IP connectivity or limited broadband IP connectivity or DVR storage.

Figure 21B:
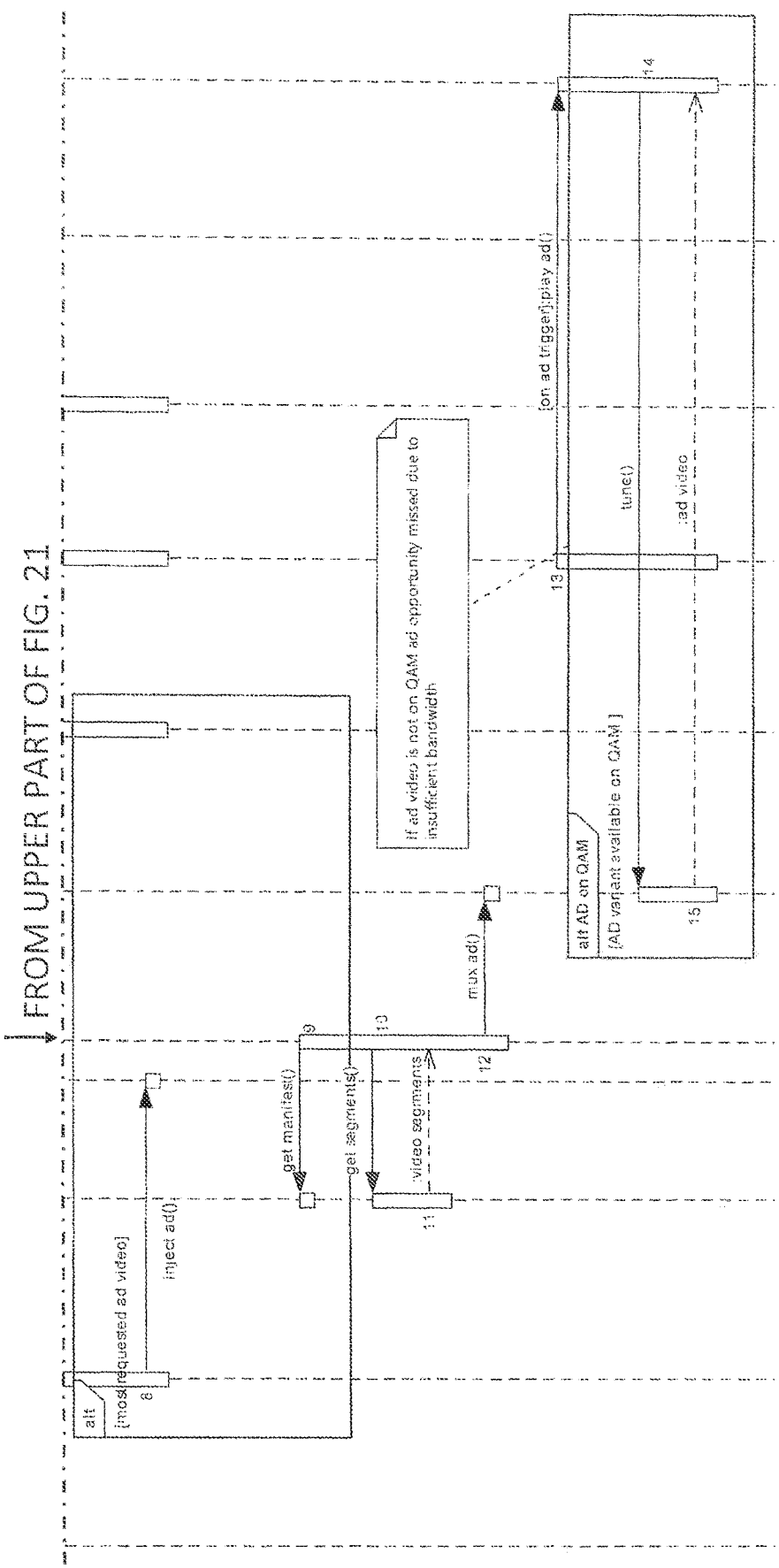
FIG. 21 is a diagram of Use-Case 6: Live-TV ad insertion with QAM delivered ad assets (impression flow).

Impression Flow for Ad Content Delivery Using Edge QAM Transport Impression Flow Reference is made now to FIG. 21 which illustrates the impression flow aspect of Use-Case 6. More specifically, FIG. 21 illustrates the sequence of events associated with QAM-based ad splicing of the invention.

The Unified Splicing Engine receives an original ad spot trigger from a live stream, as it was inserted by live stream origin. The Unified Splicing Engine uses a probability configuration as provided by the Ad Services System (see below) to decide whether a trigger will be relayed to the Ad Service. The probability configuration contains probabilities for each live stream for a trigger to be relayed to the Ad Services System.

If a trigger is conditionally delivered to the Ad Services System, the Unified Splicing Engine commands the Markup Processor to enhance the trigger with data required for the Ad Management System to respond to the ad spot opportunity and for the Ad Services System to calculate the probabilities (see below) using Markup Plugins prior to delivery. The Markup Processor relays the enhanced trigger to the Ad Services System. Based on the audience measurement and information contained in the enhanced trigger, the Ad Services System constructs a probability configuration for the STBs to relay future ad spot triggers back to the Ad Services System.

The more consumers are expected to watch a live stream, the less probability of relaying a trigger will be calculated by the Ad Services System for that channel. Only one trigger report per ad spot is processed by the Ad Services System and the rest are ignored; the probability configuration is required to minimize the number of duplicate triggers relayed by STB population to the Ad Service. The Ad Services System sends one or more requests that corresponds to a set of consumer devices' ad requests to the Ad Management System with ad spot information.

The Ad Management System replies with the following information: What ad videos are required to be delivered for a given ad spot on a given live stream; what ad videos the consumer devices are required to play; and what the fallback ad videos are in case the scheduled ad video is not a high-concurrency video and was not made available on the QAM transport.

The Ad Services System responds to the Unified Splicing Engine by inserting ad-specific triggers into the live stream or through multicast/unicast delivery transports. Insertion of the ad-specific trigger can happen either as a reaction to the original trigger in the live stream or it can be periodically based on scheduled time intervals. The Ad Services system may intelligently schedule delivery of ad content according to one or more configurable rules based on patterns of traffic and/or usage.

Upon receiving the ad spot trigger, the Ad Service will send a signal to the gateway device which transforms the IP stream (which can happen to be a fragmented video) to an MPEG transport stream. The following functions will be performed by the Gateway device: Reading the ad content manifest and video or its segments from the CDN; Mux video segments into MPEG stream; and injecting the resulting video stream into the edge QAM device for just in time for delivery.

Furthermore, the Gateway device may inject video streams either (a) as a main video stream on a dedicated edge QAM device or (b) as a video variance PID on the edge QAM device which transmits a live signal where ad spot triggers were received. Method (b) is preferred as the consumer device only switches the video PID in the same MPEG stream where the live video is and does not need to tune to another frequency. The Unified Splicing Engine on the Consumer Device checks if the required ad video is available on the multicast transport or cached in its memory. The reporting flow in this application is the same as in the use case of Live Video with a local DVR cache. Thus, a separate description of the reporting flow function is not provided.

What is claimed is:

1. A system for providing a unified video stream, including a video content item watched by a user and advertisement videos from multiple origins spliced into targeted ad spots in the content video, the multiple origins and the system forming part of a network, the system comprising:
    an ad services system, including:
    a server-side data collection service; and
    an ad service functionally associated with an ad management system; and
    a consumer device, adapted to be used by the user to watch the unified video stream, the consumer device including:
    an ad decision engine adapted to select the advertisement videos to be spliced into the targeted ad spots;
    a splicing engine adapted to process video triggers, and to manage splicing of the selected advertisement videos into the targeted ad spots, the splicing engine including the ad decision engine;
    at least one video cache, functionally associated with the splicing engine, said at least one video cache being adapted to cache advertisement videos provided thereto ahead of time from the multiple origins via one or more corresponding origin plugins, such that the cached advertisement videos are accessible to the splicing engine for seamless splicing and time-ordering thereof into the targeted ad spots;
    a media player, functionally associated with the splicing engine, and adapted to display the unified video stream;
    a client-side data collection service adapted to collect ad impressions data and user behavioral information, and to provide collected data to said server-side data collection service; and
    a plug-in based markup processing system including a markup processor, a plurality of markup plugins, and a markup configuration, the markup processor and the markup configuration being functionally associated with said ad service of said ad services system,
    wherein said ad service of said ad services system is adapted to analyze an available advertisement inventory provided by said ad management system and to provide to said consumer device an updated markup configuration, said updated markup configuration being generated by said ad services system based on ad target population segmentation rules, and provided to said consumer device prior to an expected available ad spot in the content video,
    wherein said updated markup configuration of said consumer device is adapted to provide at least one of a chain of markup rules for selection of advertisements from one or more allowed origins, segmentation rules based on geo-location, rules based on one or more obfuscated user profiles, and rules based on capabilities of said consumer device,
    wherein said ad service is adapted to dynamically refresh said markup configuration when new executable markup plugins become available,
    wherein said splicing engine is adapted to control video splice events and to ensure temporal ordering of video content played by said media player,
    wherein said splicing engine is adapted to filter ad triggers received from the origins, and to provide the filtered ad triggers to said markup processor for enrichment with targeting information, the enrichment utilizing at least one of said markup plugins utilized in a flexible sequence determined by said markup configuration, and
    wherein said ad decision engine is adapted to select the advertisement videos based on said markup configuration, instructions provided by said ad service, a state of available video origins and said at least one video cache, and based on a pre-defined ad targeting mechanism.

2. The system of claim 1, wherein said ad services system is adapted to provide to said splicing engine a probability configuration, and said splicing engine is adapted to use said probability configuration to determine whether to relay a specific ad trigger to said ad service.

3. The system of claim 2, wherein said probability configuration includes, for each line channel origin, a probability for a trigger to be relayed to said ad services system.

4. The system of claim 2, wherein said ad services system is adapted to compute said probability configuration based on video content consumption statistics collected by said server-side data collection service.

5. The system of claim 1, wherein said markup configuration is adapted to control insertion of ads into the video content item regardless of the identity of the video content item and regardless of a mechanism by which an ad is delivered.

6. The system of claim 1, wherein said ad service is adapted, ahead of said splicing, to control information received from said origins and caching of videos in said at least one video cache based on knowledge of a configuration of the network, consumer behavior, a profile and hardware capabilities of said consumer device, and said pre-defined ad targeting mechanism.

7. The system of claim 1, wherein said ad service is adapted, at a time of splicing of an ad targeted to a group of consumer devices, to control priming of at least one multicast transport.

8. The system of claim 1, wherein said markup configuration is plugin based, and is implemented using markup that abstracts access of said media player to said video origins and said at least one video cache.

9. The system of claim 1, wherein said ad decision engine is adapted to select the advertisement videos to minimize at least one of network traffic and a computational burden on said consumer device.

10. The system of claim 1, wherein when ad videos are targeted to an arbitrary consumer group which may include one or more consumers, said ad service is adapted to control multi-cast playback of ad videos to said arbitrary group of consumers, such that said playback is aligned with a scheduled ad spot.

11. The system of claim 1, wherein said ad services system is adapted to aggregate information in said server-side data collection service before providing information to said ad management system.

12. The system of claim 1, wherein:
said at least one cache of said consumer device includes only a RAM (Random Access Memory) buffer;
said ad services system is adapted to schedule delivery of ad content to said consumer device according to one or more configurable rules which are based on traffic patterns in the network; and
said consumer device is adapted to only cache a specific ad in said RAM buffer if said specific ad is not available in a multicast transport.

13. The system of claim 1, wherein:
the video content comprises locally recorded DVR content;
said consumer device is adapted to capture ad spots during recording of said recorded DVR content; and
said consumer device is adapted to use said captured ad spots for pre-caching of ads prior to splicing thereof.

* * * * *